(12) United States Patent
Tafoya

(10) Patent No.: US 10,493,500 B2
(45) Date of Patent: Dec. 3, 2019

(54) HEAT EXCHANGER

(71) Applicant: David Jonathan Tafoya, Maple Grove, MN (US)

(72) Inventor: David Jonathan Tafoya, Maple Grove, MN (US)

( * ) Notice: Subject to any disclaimer, the term of this patent is extended or adjusted under 35 U.S.C. 154(b) by 0 days.

(21) Appl. No.: 15/194,449

(22) Filed: Jun. 27, 2016

(65) Prior Publication Data
US 2016/0375469 A1    Dec. 29, 2016

Related U.S. Application Data

(60) Provisional application No. 62/185,166, filed on Jun. 26, 2015.

(51) Int. Cl.
*B08B 3/10* (2006.01)
*B08B 3/08* (2006.01)

(52) U.S. Cl.
CPC ...................... *B08B 3/10* (2013.01)

(58) Field of Classification Search
CPC ..... B08B 3/10; B08B 3/108; B08B 2203/007; B08B 3/08; B33Y 40/00; B29C 67/0096
See application file for complete search history.

(56) References Cited

U.S. PATENT DOCUMENTS

| | | | | |
|---|---|---|---|---|
| 3,308,839 A * | 3/1967 | Barday | ..................... | B01D 1/02 134/107 |
| 5,782,252 A * | 7/1998 | Lewis | ....................... | B08B 3/06 134/103.1 |
| 7,128,075 B2 * | 10/2006 | Publ | ....................... | B08B 3/006 134/105 |
| 7,546,841 B2 * | 6/2009 | Tafoya | ..................... | B08B 3/045 134/106 |
| 2004/0200504 A1 * | 10/2004 | Publ | ....................... | B08B 3/006 134/18 |
| 2005/0029175 A1 * | 2/2005 | Farr | ..................... | B29C 67/0059 210/143 |
| 2005/0103360 A1 * | 5/2005 | Tafoya | ..................... | B08B 3/045 134/18 |
| 2009/0211616 A1 * | 8/2009 | Tafoya | ..................... | B08B 3/045 134/57 R |
| 2009/0241997 A1 * | 10/2009 | Tafoya | ..................... | B08B 3/045 134/34 |
| 2009/0283109 A1 * | 11/2009 | Moussa | ..................... | B08B 3/02 134/1 |
| 2009/0283119 A1 * | 11/2009 | Moussa | ..................... | B08B 3/02 134/57 R |
| 2011/0120496 A1 * | 5/2011 | Obidi | ..................... | B01D 5/006 134/10 |
| 2011/0186092 A1 * | 8/2011 | Publ | ......................... | B08B 3/10 134/109 |

(Continued)

*Primary Examiner* — Benjamin L Osterhout
(74) *Attorney, Agent, or Firm* — Allen J. Oh

(57) ABSTRACT

A system for removing soluble support material from a prototype part may include a container for receiving the prototype part. A pump may be in fluid communication with the container and may be configured to pump a solution into the container and out of the container. A cooling module, such as a heat exchanger, may be in fluid communication with the pump. A temperature sensor may be operatively coupled to the cooling module and may activate the cooling module if a sensed temperature exceeds a threshold.

9 Claims, 33 Drawing Sheets

(56) References Cited

U.S. PATENT DOCUMENTS

| | | | |
|---|---|---|---|
| 2011/0186097 A1* | 8/2011 | Publ | B08B 3/10 134/56 R |
| 2014/0060674 A1* | 3/2014 | Publ | B08B 3/006 137/544 |
| 2014/0137904 A1* | 5/2014 | Suarez | B08B 3/006 134/109 |

* cited by examiner

FIGURE E

HEAT EXCHANGER

CROSS-REFERENCE TO RELATED APPLICATION

This application claims the benefit of U.S. Provisional Application No. 62/185,166 filed Jun. 26, 2015, which is hereby incorporated by reference herein.

TECHNICAL FIELD

The present disclosure relates generally to processes for creating rapid prototype parts. More particularly, the present disclosure relates to removing temporary support material generally utilized in the production of rapid prototype parts.

TECHNICAL BACKGROUND

Fused Deposition Modeling (FDM) can develop rapid prototype parts or functional models from a thermoplastic material such as ABS (acrylonitrile butadiene styrene) and polycarbonate. FDM utilizes a computer numeric controlled (CNC) extruder-head that squeezes a fine filament of melted thermoplastic through a modeler nozzle. The controller, operating in accord with pre-select, known variables, activates the modeler nozzle to deposit heated plastic layer-by-layer to form the desired geometric shape. In some instances where select features of the part are left unsupported as a result of the part's orientation, the FDM-based machine may incorporate the use of a second nozzle for extruding therethrough support material to create support structures for any cantilevered portions of the part. In cases where the part's build comprises small, intricate features, a water soluble support material may be used to further facilitate or ease removal from the part's build upon completion. Once the appropriate supporting layer is built, thermoplastic, as discussed above, is extruded through the modeler nozzle to form the part's build. Once the part has finished its successive layers and the build is complete, the part is removed from the FDM-based machine for inspection and final surface preparation, which may include removal of any support material, additional machining, and/or application of a finish coating material.

In instances where a water soluble support material is used, the art offers a range of techniques for removing the support material from the rapid prototype part. One such technique may simply involve immersing the part in a suitable solvent repeatedly via manual or automated means and manually removing the support material using a brush or a pointed tool. Another technique commonly employed in the art may involve placement within a conventional immersion parts washer of the type generally designed to remove grease, carbon, resins, tar, and other unwanted petroleum-based residuals from automotive parts and machine shop equipment. Typically, the conventional immersion parts washer of this type may comprise operable features of ultrasonics to facilitate the cleansing action of the solvent. Although the operable feature noted above may or may not adequately address the removal of support material, the conventional immersion parts washer can be costly in terms of purchase, maintenance and operation, particularly for this limited purpose, and inappropriate in a variety of environmental settings. Given that most machinery having rapid prototype part making capabilities is operated from within an office setting or a similarly suited environment, the coinciding use of a conventional immersion parts washer makes it unacceptable and inappropriate in maintaining a sound, clean environment. Further, some conventional immersion parts washer may expose one to unacceptable health risks, particularly those having ultrasonic capabilities (see World Health Organization Report on Ultrasound and Ultrasonic Noise, Geneva 1982).

Accordingly, there remains a need for a dedicated apparatus capable of removing water soluble support material from a rapid prototype part and operating side-by-side with a rapid prototype part making machine commonly placed and operated in an office setting or a similarly suited environment.

SUMMARY OF THE DISCLOSURE

According to various example embodiments, a system for removing soluble support material from a prototype part may include a container for receiving the prototype part. A pump may be in fluid communication with the container and may be configured to pump a solution into the container and out of the container. A cooling module, such as a heat exchanger, may be in fluid communication with the pump. A temperature sensor may be operatively coupled to the cooling module and may activate the cooling module if a sensed temperature exceeds a threshold.

Additional objects, advantages, and features will become apparent from the following description and the claims that follow, considered in conjunction with the accompanying drawings.

BRIEF DESCRIPTION OF THE DRAWINGS

Various embodiments will now be described by way of example with reference to the accompanying drawings, in which.

DETAILED DESCRIPTION

While the principles of this disclosure may be embodied in many different forms, various embodiments are illustrated in the accompanying drawings and are described in detail hereinafter with the understanding that the present disclosure is to be considered to exemplify the principles of the present disclosure and is not intended to limit the disclosure to the embodiments illustrated and presented herein. The embodiments described herein may have utility as an apparatus for removing soluble supports from a rapid prototype part produced from a rapid prototype part making machine such as those that incorporate Fused Deposition Modeling (FDM) technology and for temperature regulation in such an apparatus.

Referring now to FIGS. 1-5, there is shown generally at 10 a support removal apparatus comprising a tank assembly 12 having means for heating and agitating an aqueous cleaning solution and a cabinet 14 having an interface controller 16 mounted on an exterior panel 18 thereof for temporally controlling heat and agitation outputs. In some embodiments, an aqueous cleaning solution that is well suited for this application comprises a mixture of 25-70 weight percent sodium or potassium hydroxide and 5-30 weight percent sodium or potassium carbonate, collectively forming a granular sodium or potassium composition suitable for mixing with water. For example, a concentration ratio of 1.05 pounds of granular sodium or potassium composition per one gallon of water suitably serves in removing water soluble support material from rapid prototype parts within a tolerable temperature range noted hereinafter.

Figure 2:
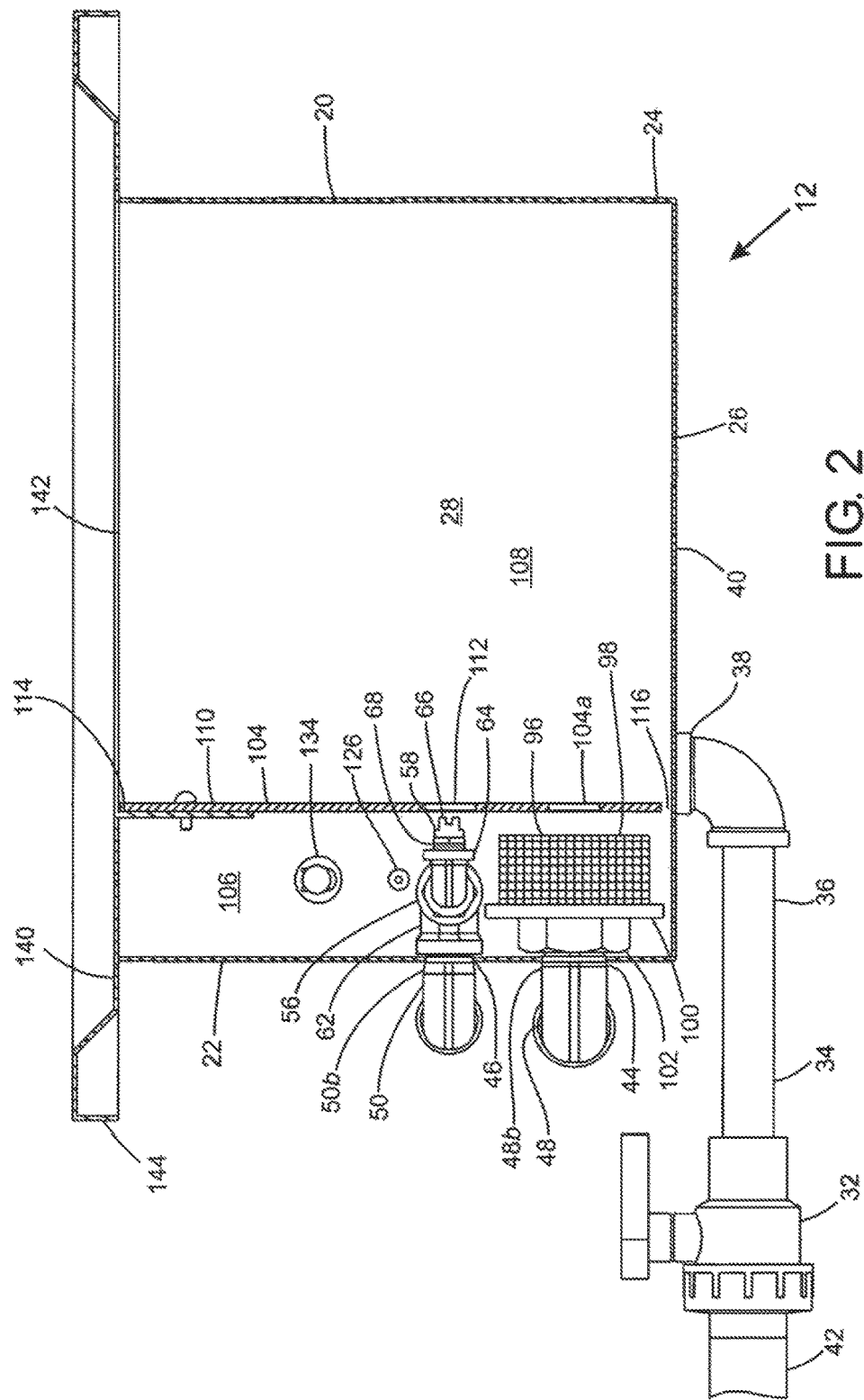
FIG. 2 is a side cross sectional view of the embodiment of FIG. 3 taken on line 2-2 of FIG. 3 illustrating a manifold assembly and strainer basket situated within an interior chamber.
Figure 3:
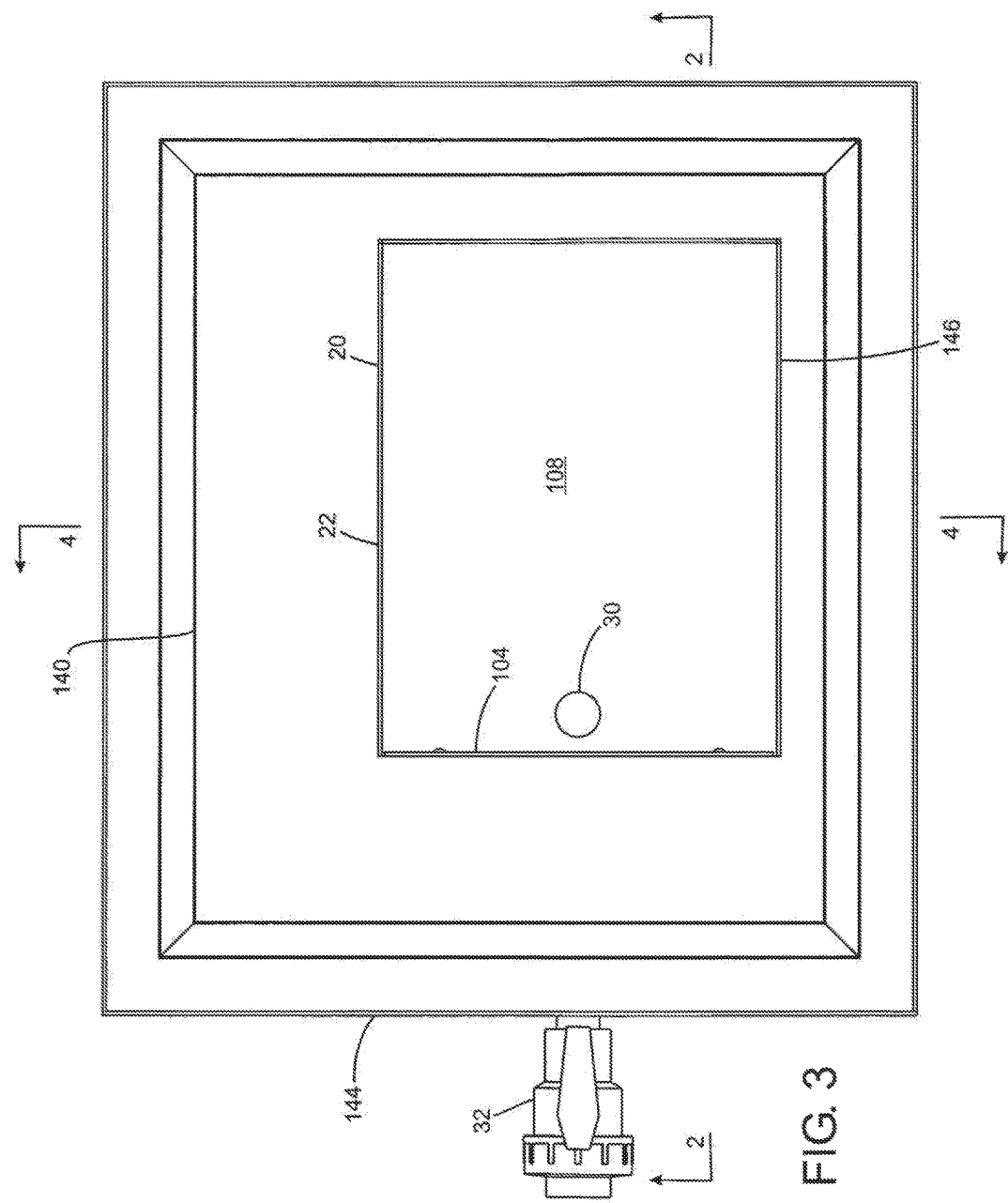
FIG. 3 is a top view of the embodiment of FIG. 1 illustrating a work surface mounted to a retention tank.

The tank assembly 12, as shown in FIGS. 2 and 3, comprises a retention tank 20 having four side walls 22 substantially arranged and connected to one another to form a box-like structure having a bottom leading edge 24 fixedly attached to and along the perimeter of a base 26, collectively forming an interior chamber 28 for containing and holding the aqueous cleaning solution. In the illustrated embodiment, an aperture 30 extending through the base primarily serves as means for removing aqueous cleaning solution from the interior chamber for purposes of repair and maintenance and like activities. Retention of aqueous cleaning solution in the interior chamber 28 as well as removal therefrom and through the aperture is principally controlled by a valve 32 connected in line to a drain pipe 34 having an input end 36 threadably connected to a drain sleeve 38 mounted to and over the aperture at an exterior side 40 of the base and an output end 42 terminating at an external waste line or sump collector.

Figure 1:
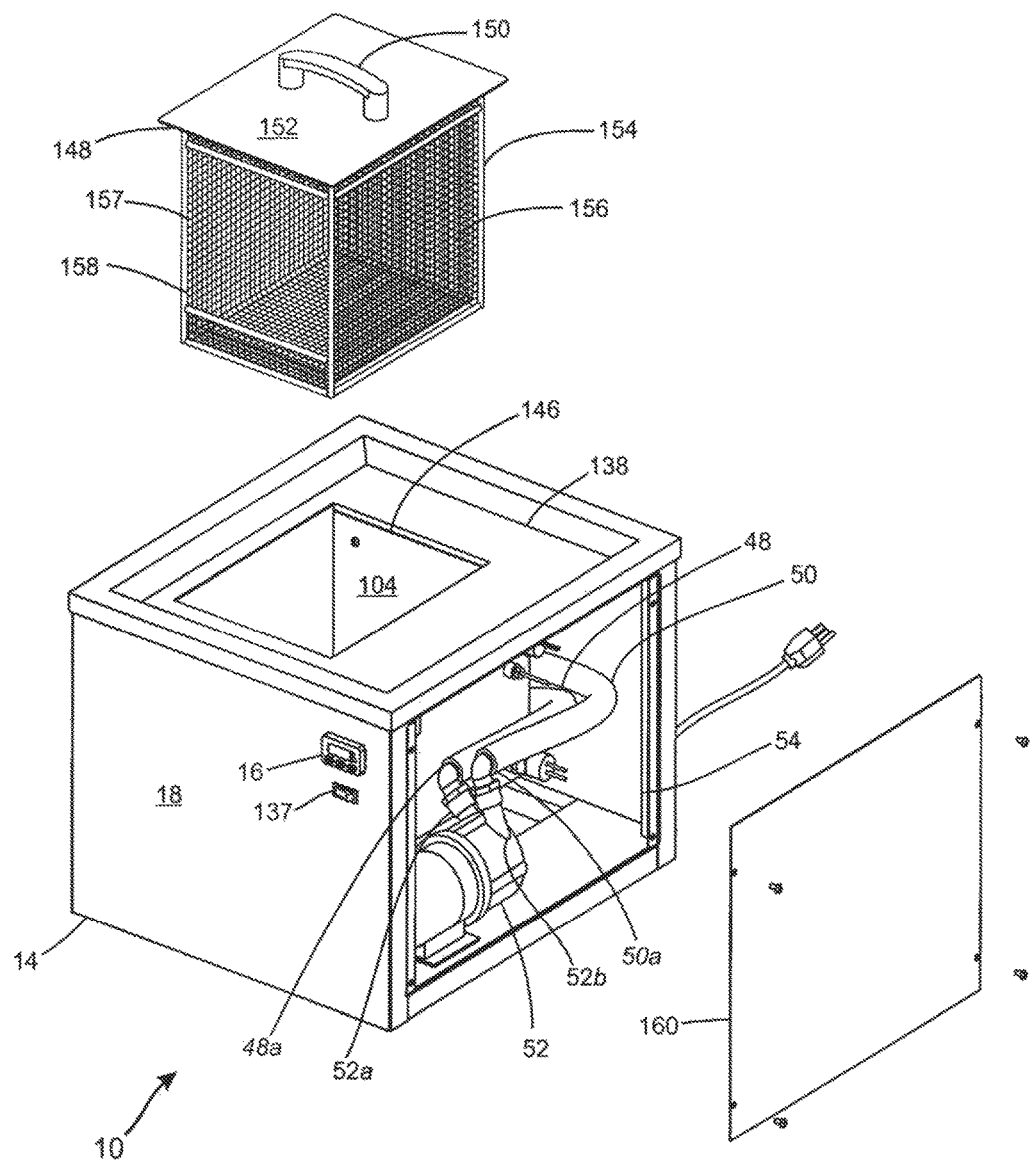
FIG. 1 is a perspective view of one example embodiment illustrating a support removal apparatus equipped with a basket.
Figure 4:
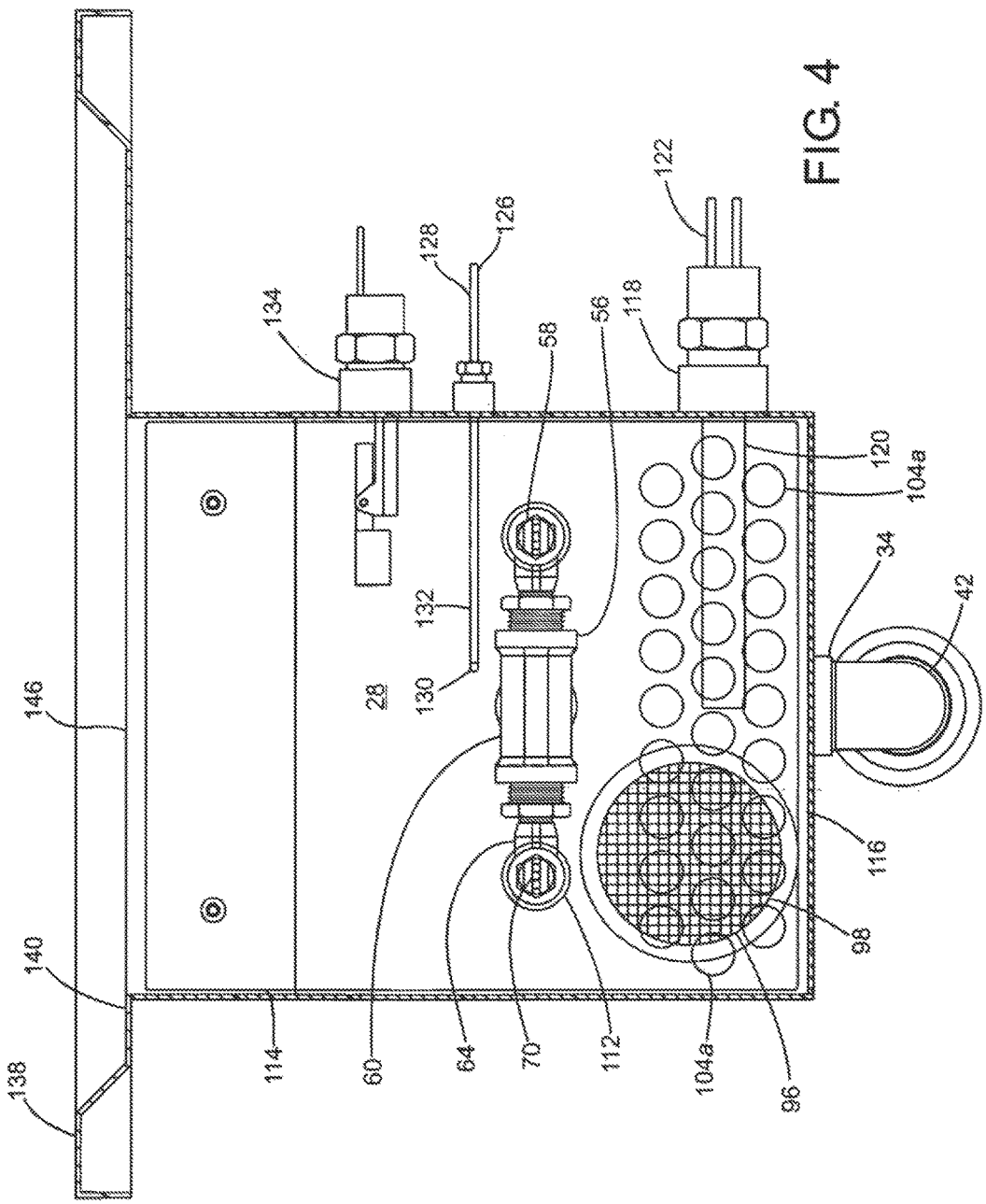
FIG. 4 is a side cross sectional view of the embodiment of FIG. 3 taken on line 4-4 of FIG. 3 illustrating a strainer basket and a manifold assembly.
Figure 6:
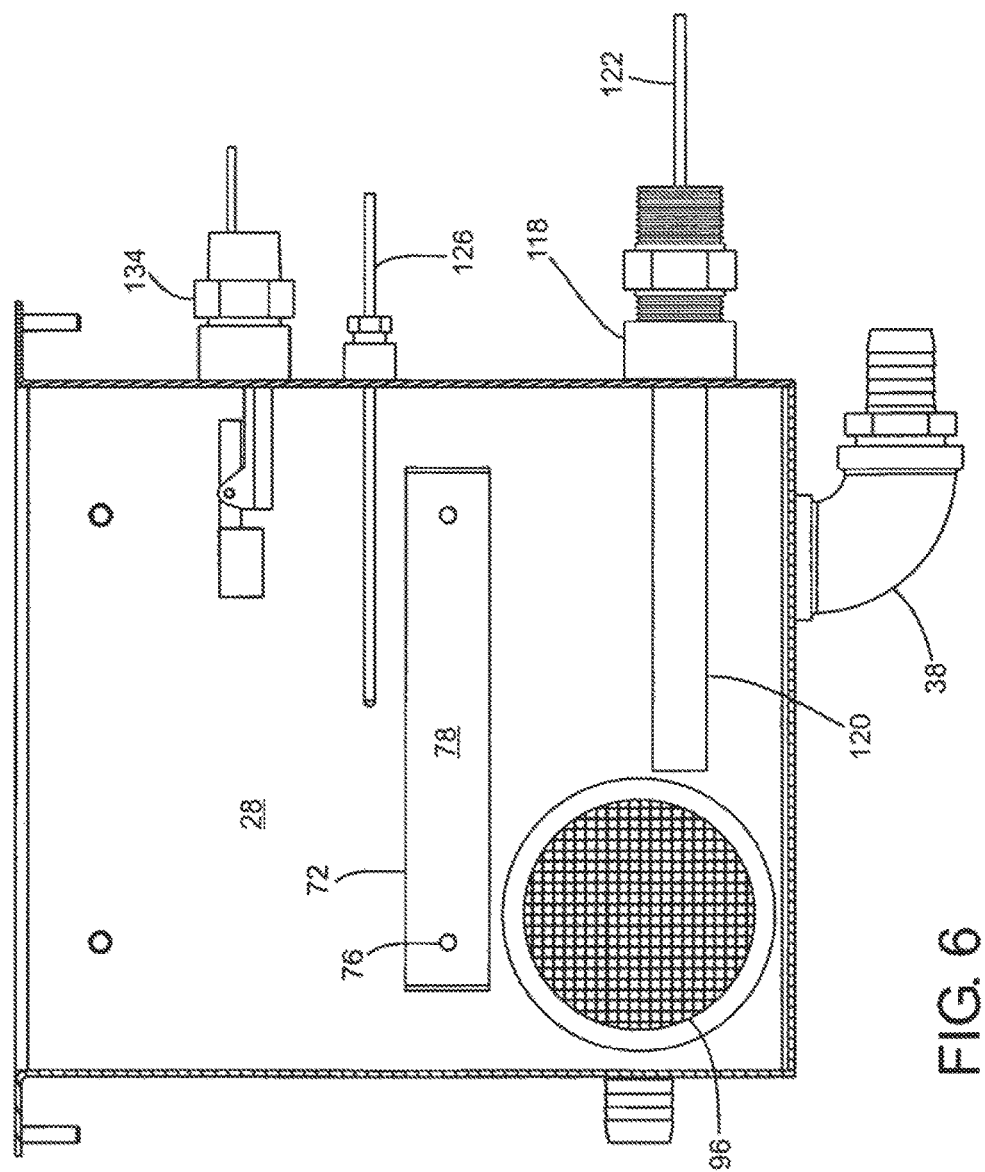
FIG. 6 is a side cross sectional view of the embodiment of FIGS. 1 and 3 illustrating an alternative manifold assembly having an elongate tubular member.
Figure 7:
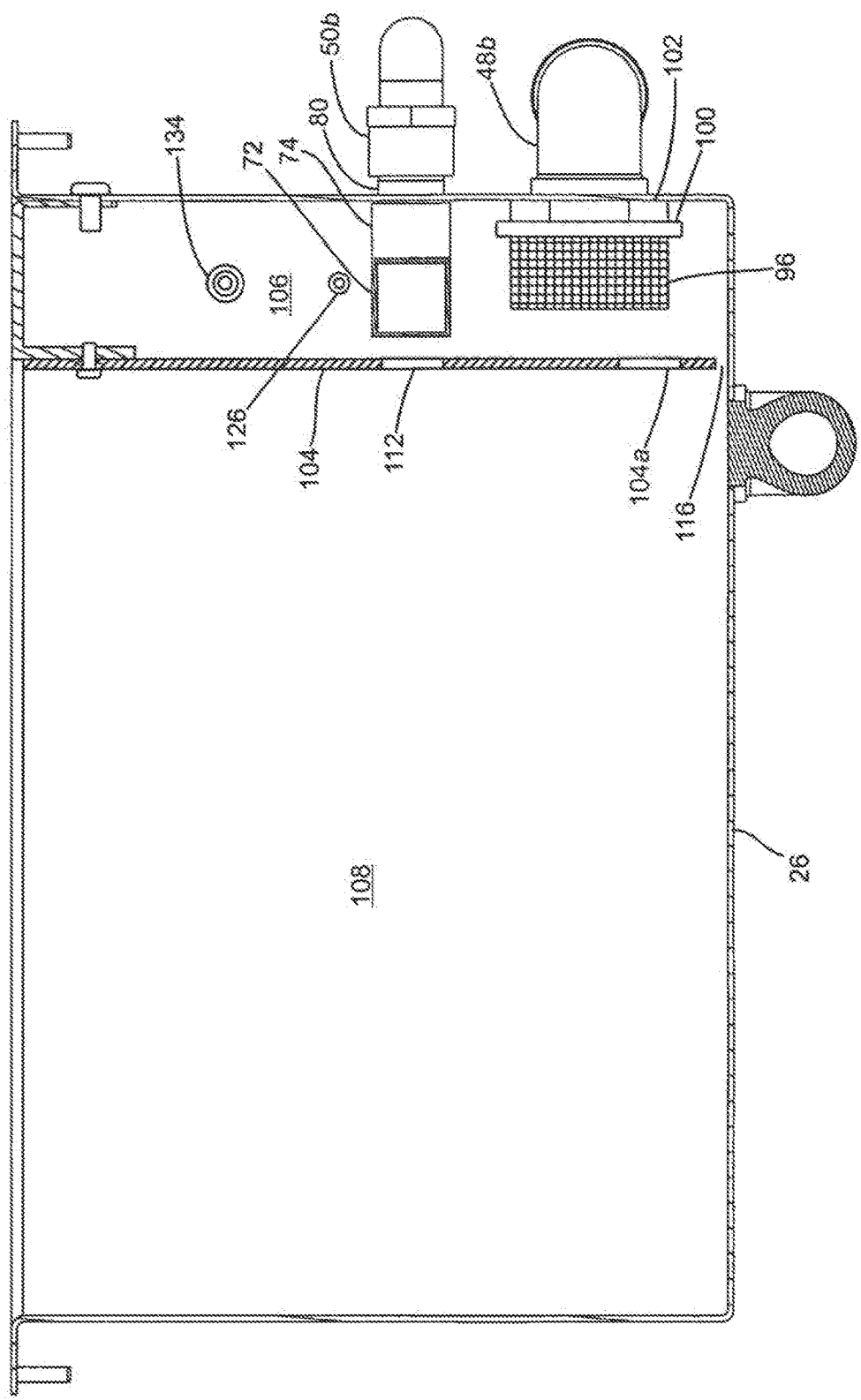
FIG. 7 is a side cross sectional view of the embodiment of FIGS. 1 and 3 illustrating an alternative manifold assembly having an elongate tubular member connected to an inlet fitting.
Figure 8:
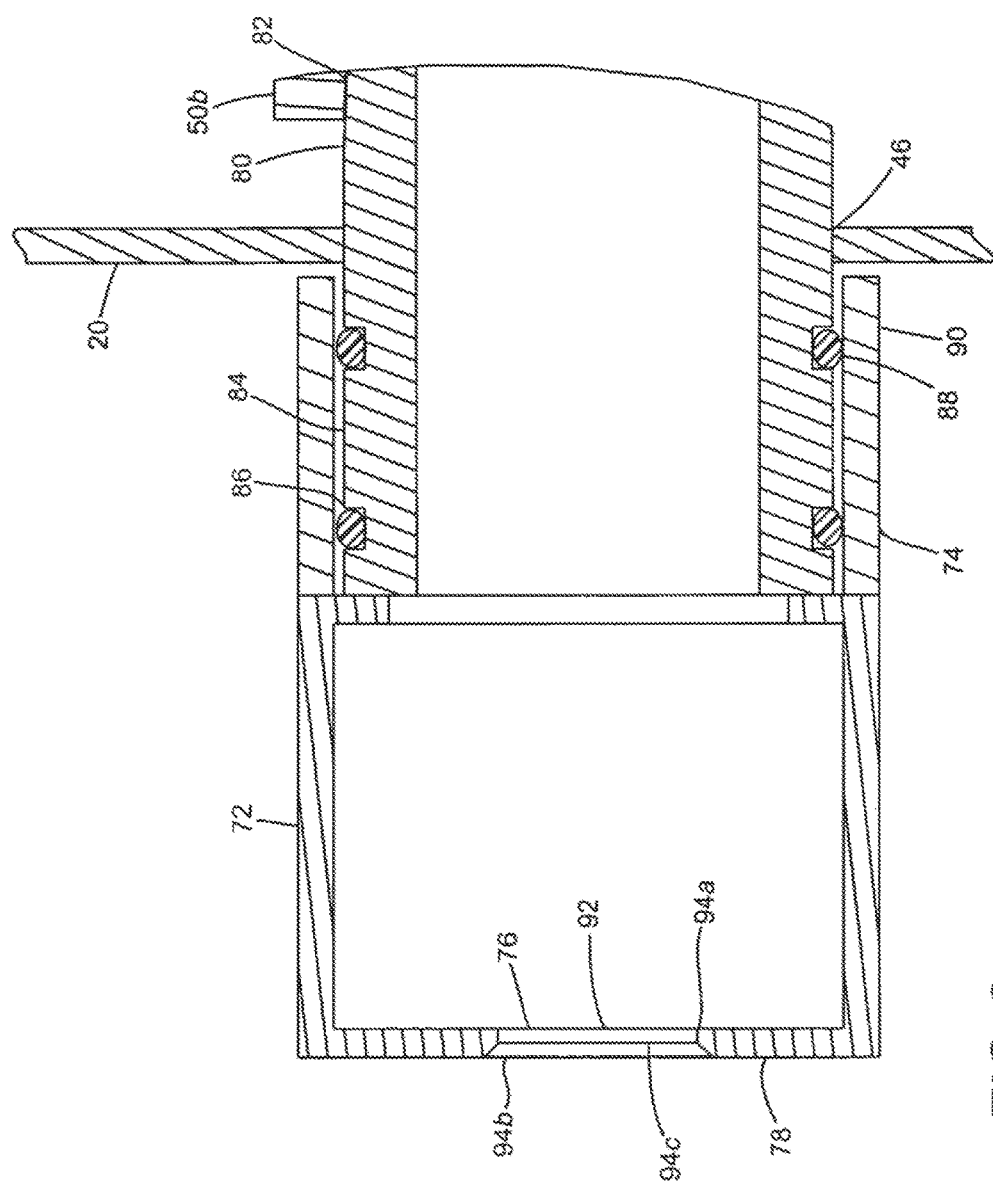
FIG. 8 is a partial side cross sectional view of the embodiment of FIGS. 1 and 3 illustrating an elongate tubular member connected to a second end of an outlet piping.

As shown in FIGS. 1 and 2, one side wall 22 of the retention tank preferably comprises intake and outlet apertures 44, 46 for passage of intake and outlet piping 48, 50, respectively, each having first ends 48a, 50a attached to intake and outlet sides 52a, 52b of a pump 52 mounted exterior to the retention tank and housed within an interior portion 54 of the cabinet. Pumps most suited for this application comprise of types having centrifugal or magnetic operable means, to name a couple known in the art to possess favorable characteristics to hydraulically convey and circulate aqueous cleaning solution in and through the retention tank 20. However, regardless of the pump type used, pump seals as well as other operable components thereof are preferably fabricated from materials which are compatible for use in a corrosive, caustic environment given the alkalinity of the aqueous cleaning solution. Accordingly, seals made from ethylene propylene diene monomer (EPDM) or VITON® and metallic components made from stainless steel tolerably perform well within the predetermined range of operation (temperature and pH) without deleterious impact to pump performance. As depicted in FIG. 2, a second end 50b of the outlet piping 50 is adaptably mounted to a manifold assembly 56 principally serving as means for agitating the aqueous cleaning solution contained within the retention tank. In some embodiments, the manifold assembly is housed within a portion of the interior chamber 28 and comprises at least one nozzle head 58 threadably mounted to the second end of the outlet piping. In an alternative arrangement, one of which utilizes more than one nozzle head, the manifold assembly comprises a pipe tree fitting 60 having a feed end 62 fixedly attached to the second end 50b of the outlet piping and more than one branch ends 64 extending therefrom to evenly distribute the incoming flow into an equivalent number of nozzle heads 58. It is noted herein that the manifold assembly 56 may comprise one or more in number with each being selectively arranged about the retention tank 20 to provide for opposing, cross interaction of flows from each nozzle head, suitably needed in some instances to achieve the desired level of agitation or turbulence within the interior chamber 28. In this alternative arrangement, the outlet piping is further divided with appropriate fittings commonly available in the art and selectively connected to a predetermined number of pipe tree fittings 60 each having multiple branch ends 64 fitted with a nozzle head 58. Each nozzle head, as best illustrated in FIGS. 2 and 4, comprises a nozzle tip 66 and a threaded body 68 threadably mounted to each branch end 64. In order to develop and continually establish a predominate level of agitation within the interior chamber, each nozzle tip is suitably configured with an orifice 70 having a diameter ranging from 0.05 to 0.375". In this diametric range combined with a pump capacity ranging from 3-30 gallons per minute at a power output ranging from 0.04-2 HP, each nozzle tip 66 is substantially capable of developing an output pressure ranging from 5 to 60 psi, respectively. In this pressure range, each nozzle tip provides for a jet stream having a tight dispersion pattern capable of reaching and interacting with and reflecting off the opposing side wall of the retention tank 20 to uniformly agitate the aqueous cleaning solution within the interior chamber. In instances where the retention tank comprises a larger volumetric capacity, more than one manifold assembly 56, as described above, may be needed to create and maintain homogenous agitation of the aqueous cleaning solution for sustained and continued removal of support material from the rapid prototype part(s). In an alternative embodiment, the manifold assembly in lieu of the nozzle head 58 may comprise of an elongate tubular member 72 having an inlet fitting 74 hydraulically attached and extending perpendicularly thereto and a plurality of orifices 76 being positioned about an outer face 78 thereof, substantially in the manner shown in FIG. 6. Assembly of the elongate tubular member to the second end 50b of the outlet piping is accomplished by a sleeve 80 having a first end 82 fixedly attached thereto and a second end 84 having at least two concentric depressions 86 for accepting therein an equivalent number of o-rings 88. As illustrated in FIG. 8, a free end 90 of the inlet fitting 74 is slidably positioned onto and over the second end 84 and moved thereabout until the o-rings are completely encased within the inner confines of the inlet fitting. In the embodiment shown in FIG. 8, each orifice 76 situated about the outer face 78 comprises a wall 92 having a anterior portion 94a thereof extending perpendicular thereto and a posterior portion 94b extending angularly outward a predetermined amount from a midpoint position 94c in the wall, specifically where the anterior portion terminates within the confines of the wall.

As illustrated in FIG. 2, a second end 48b of the intake piping 48 comprises a basket strainer 96 having a plurality of apertures 98 extending therethrough for passage of the aqueous cleaning solution during cyclic circulation thereof while effectively eliminating the passage of small rapid prototype part(s) and residual support material suspended in solution. A backing plate 100 fixedly attached to the basket strainer and having a threaded coupling 102 fixedly attached thereto suitably serves as means for mounting the strainer basket to the second end of the intake piping, substantially in the manner shown in FIG. 2. To further mitigate undesirable interaction of small rapid prototype part(s) in suspension with the manifold assembly 56 and basket strainer, where positive and negative pressure is respectively observed, the retention tank 20 is fitted with a plate guard 104 to divide the interior chamber 28 into first and second compartments 106, 108. In the embodiment of FIG. 2, the plate guard comprises an upper leading edge 110 and a plurality of nozzle apertures 112 extending therethrough to accommodate an equivalent number of nozzle heads 58 for sustained and continued passing of the aqueous cleaning solution into the second compartment 108 of the interior chamber 28. Mounting of the plate guard within the interior chamber is substantially accomplished by attaching the upper leading edge 110 to a portion of a work surface 114 suitably situated above and attached to the retention tank. All unattached edges of the plate guard are selectively positioned away from the side walls 22 and base a predetermined distance to form an elongate opening 116 therealong, purposefully to maintain circulation of the aqueous cleaning solution contained within the interior chamber of the retention tank. To enhance circulation of the aqueous cleaning solution to a greater extent than that provided by the elongate opening, the plate guard 104 further comprises a plurality of openings 104a collectively positioned near the bottom thereof adjacent to the base 26. Preferably each opening is sized accordingly to hinder movement of most rapid prototype part(s) from the second compartment into the first compartment, toward the basket strainer 96, predominantly caused by the presence of negative pressure thereat.

Figure 9:
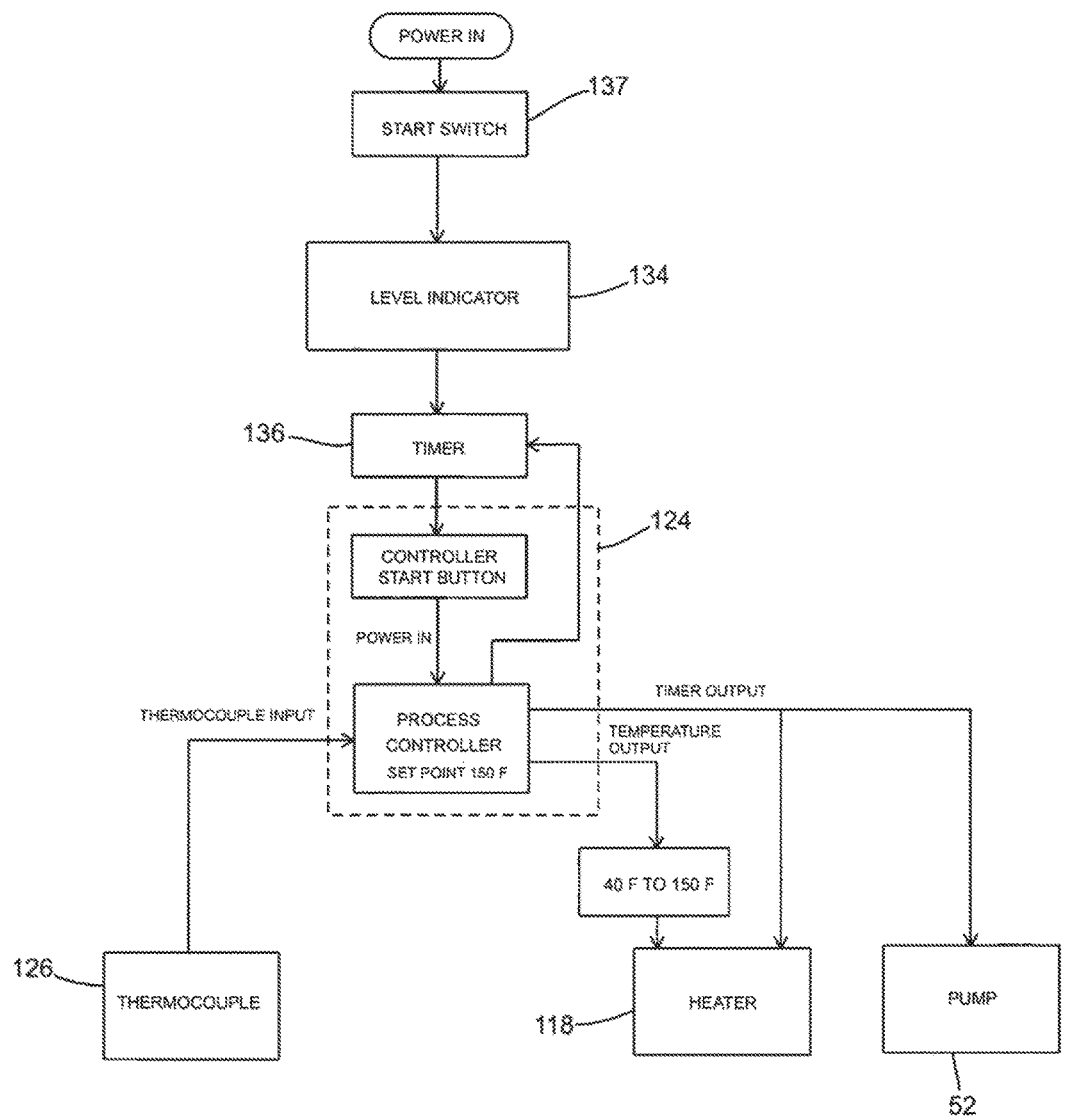
FIG. 9 is a functional block diagram illustrating functional relationships between a microprocessor, a thermocouple, pump, heating element, and level indicator.

To further assist the cleansing action of the aqueous cleaning solution for effective removal of support material from rapid prototype part(s), the retention tank is configurably fitted with a heating element 118 having an internal end 120 situated within the interior chamber and an external end 122 electrically connected to an output line of a microprocessor 124. As shown in FIG. 4, the heating element is mounted adjacent to the base in the first compartment 106, specifically being positioned most near the side wall where the manifold assembly 56 and basket strainer are located to facilitate distribution of heat to the aqueous cleaning solution via the pump 52 feeding solution into the first and second compartments. Although numerous types of heating elements may be suited for this application, it has been found that a heating element 118 having a power rating ranging from 50-300 Watts/sq. in., substantially heats the aqueous cleaning solution to 90-180° F. within a modest time range of at least 15-90 minutes, respectively. The heating element may comprise a variety of geometric configurations and design features such as those having an internal end selectively shaped as a band, cable, tubular cartridge, strip, to name a few most widely known and available in the art, providing each meets the above operating specifications. It is noted herein that certain embodiments may alternatively employ a heating element mounted externally to the retention tank in lieu of the heating element mounted internally in the interior chamber. In such embodiments, the retention tank primarily serves as a suitable conductor in transmitting heat to the aqueous cleaning solution. In similar regard in terms of substantiating the number of nozzle heads 58, a retention tank comprising a larger volumetric capacity may necessitate a heating element having a higher heatable surface area and output to maintain the overall effectiveness of the aqueous cleaning solution. Given the operating characteristics of the aqueous cleaning solution in terms alkalinity, the internal end preferably comprises a sheath fabricated from materials such as stainless steel 304 or 316, INCONEL®, INCOLOY®, MONEL™, or titanium, collectively of the type capable of resisting premature failure of the heating element during operative conditions. Working in conjunction with the heating element, a thermocouple 126 mounted to the retention tank 20 suitably serves as means for controlling the temperature of the aqueous cleaning solution within a tolerable range noted hereinbefore. As depicted in FIG. 4, the thermocouple comprises an external lead 128 electrically connected to the input side of the microprocessor 124 and an internal probe 130 extending inwardly within the first compartment for which is readily capable of sensing the ambient temperature of the aqueous cleaning solution and making timely and minute adjustments to the heating element 118 via the microprocessor. Like the heating element in terms of material choice, the internal end comprise a sheath 132 fabricated from or coated with a material most compatible for operation in a corrosive environment. In addition to the available means for heating and agitating the aqueous cleaning solution, a level indicator 134 of the type shown in FIG. 4 provides means for activating power to the microprocessor to permit activation of a timer switch 136 which correspondingly controls the duration of operating the heating element and pump 52. Further, the level indicator suitably serves as a safety device insofar of eliminating premature activation of the pump when the interior chamber 28 is absent of aqueous cleaning solution. Level indicators comprising operable features of optics, magnetic, mechanical means, to name a few commonly available in the art, may be suited for this application providing each comprises means for connectivity to the microprocessor 124. As illustrated in FIG. 9, the microprocessor selectively controls outputs to the pump and heating element operably based on time and temperature set points established by the operator or manufacturer. In the embodiment shown in FIG. 4, a temperature set point of approximately 150° F., as set by the manufacturer, establishes effective performance of the aqueous cleaning solution. Time input, on the other hand, is selectively controlled by the user via the interface controller 16 comprising means for displaying operating variables of temperature and time. An example of a suitable microprocessor for this application is the type manufactured by the Watlow Company of St. Louis, Mo., specifically being designated as Watlow Series 935B. It should be understood that many other types of microprocessors may be used in this application providing it comprises capabilities to control the desired outputs noted above. It is further understood that all electrical components described above, including the pump, heating element, thermocouple, level indicator and microprocessor, may be electrically wired in any known manner. In operation, with reference to FIG. 9, power is initially supplied to a start switch 137 which subsequently activates the level indicator 134. Upon the level indicator detecting the level of the aqueous cleaning solution in the retention tank, power is further transmitted to the microprocessor, at which time the timer is activated by the operator to set the temporal limits for operating the pump 52 and heating element 118. Process startup is finally achieved by the operator activating a controller start button integrally made part of the microprocessor. It is noted herein that the heating element only operates within a temperature range of approximately 40° F. to the set point of 150° F., notwithstanding the time inputs, in contrast to the pump 52 which operates for the full duration of the time input. Upon expiration of the timer's set limits, power to the pump as well as the heating element is disabled via the microprocessor 124. Reactivation of the cleaning cycle substantially involves re-setting the timer function and activating the controller start button.

Figure 5:
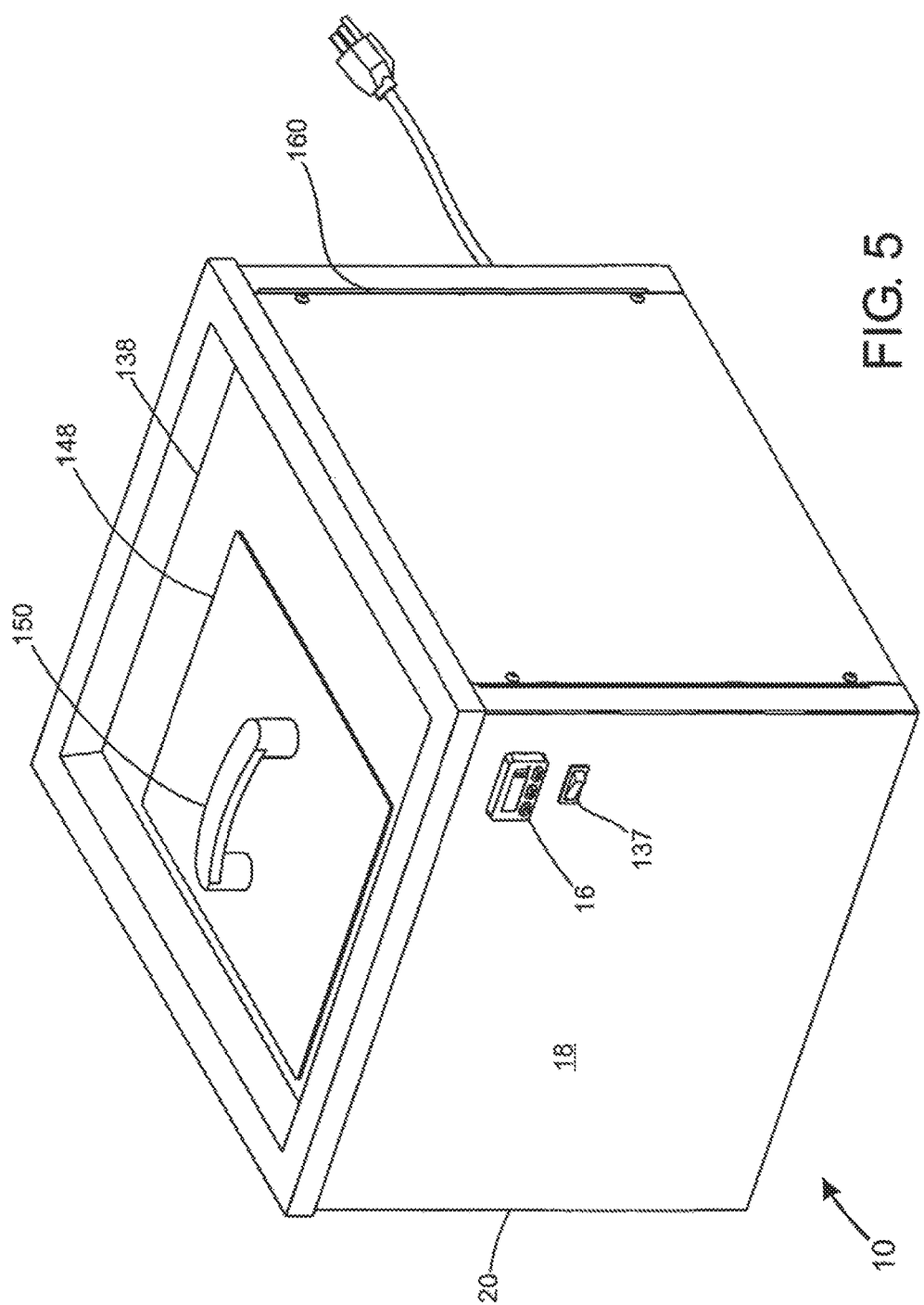
FIG. 5 is a perspective view of the embodiment of FIGS. 1 and 3 illustrating a support removal apparatus equipped with a lid.

As noted above, the retention tank 20 is fitted with a work surface 138 of the type comprising a recessed portion 140 having an opening 142 extending therethrough, collectively being contained within an upper ledge 144 extending along the perimeter of the work surface. The work surface, particularly the recessed portion, primarily serves in containing and channeling the aqueous cleaning solution downwardly toward the retention tank in the event of inadvertent spillage caused by the removal of rapid prototype parts from the second compartment 108. In the embodiment illustrated in FIGS. 1 and 3, the opening comprises a geometric configuration and size substantially conforming to an accessible opening 146 of the second compartment. To mitigate further loss of aqueous cleaning solution, primarily due to evaporation, the work surface further comprises a lid 148 having a geometric configuration substantially conforming to the opening 142 of the recessed portion and a handle 150 fixedly attached to an upper surface 152 thereof to provide means for removing and placing the lid onto and over the accessible opening 146. In some applications, the lid, as shown in FIG. 1, is adaptably fitted with a basket 154 hanging downwardly therefrom for holding small rapid prototype parts which easily suspend in solution and readily move about the interior chamber 28. In this regard, the basket comprises perforated walls 156 substantially arranged to form an interior portion 157 capable of containing the rapid prototype parts yet permitting the passing of aqueous cleaning solution upon removal from the retention tank. In the embodiment shown in FIG. 1, the basket 154 comprises an overall geometric configuration substantially capable of fitting within the confines of the second compartment 108 and passing unhindered through the opening 142. Access to the basket is made possible by a parts opening 158 extending through one of its perforated walls 156 and when placed within the interior chamber, the parts opening abuts up against the sidewall 22 of the retention tank to impede outgoing flow of rapid prototype parts into the interior chamber. As illustrated in FIGS. 1 and 5, the cabinet 14 further comprises features for operation and maintenance, including an access panel 160 removable therefrom to gain access to the pump 52 and other operable components and, as noted earlier, an interface controller display and the start switch 137 mounted externally on the cabinet. In most applications, the work surface 138 is welded to the retention tank and collectively placed into and attached to the cabinet by a plurality of screws.

Figure 16:
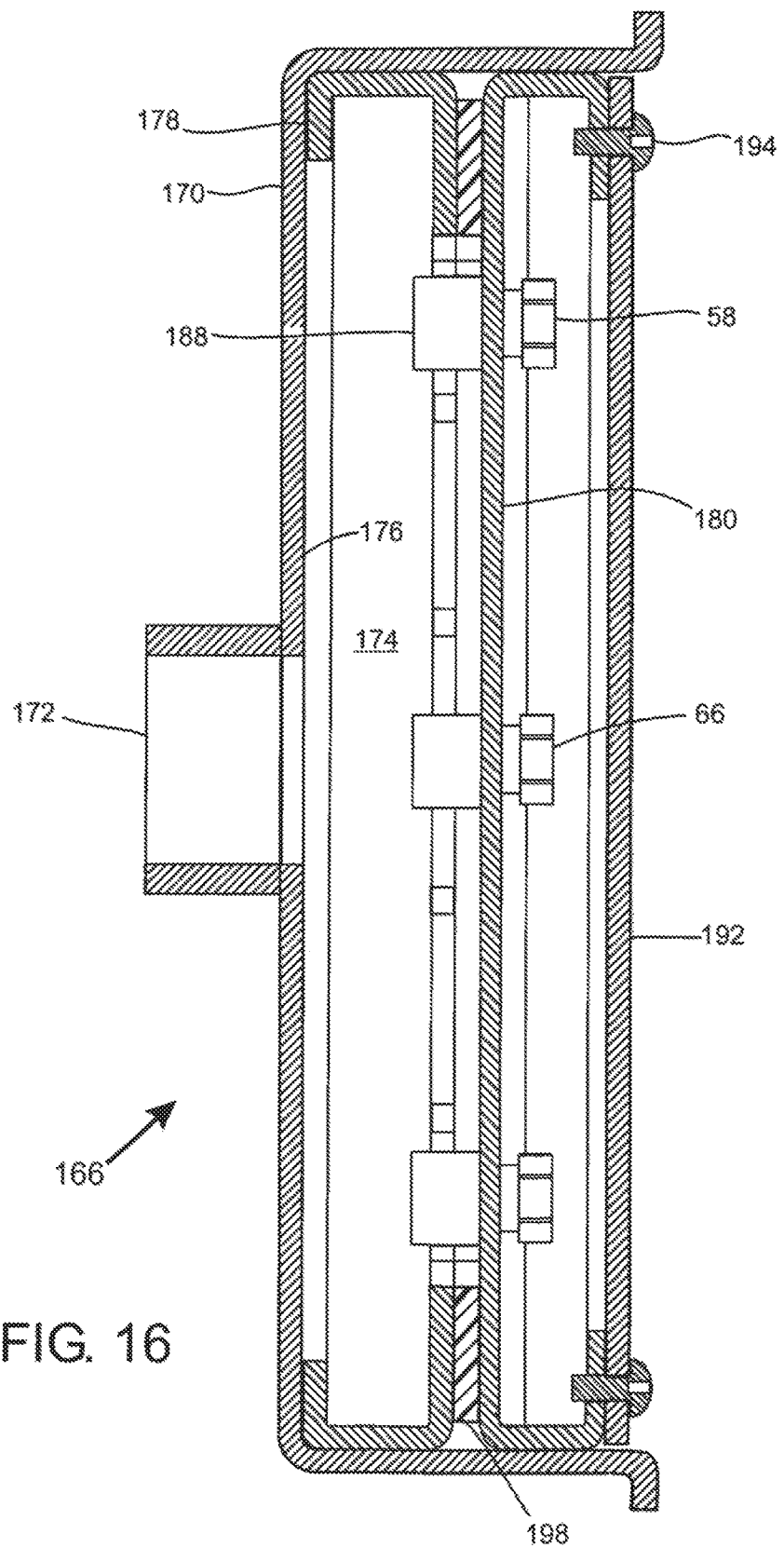
FIG. 16 is a side cross sectional view of the embodiment of FIG. 15 taken on line 16-16 of FIG. 15 illustrating a box manifold.
Figure 17:
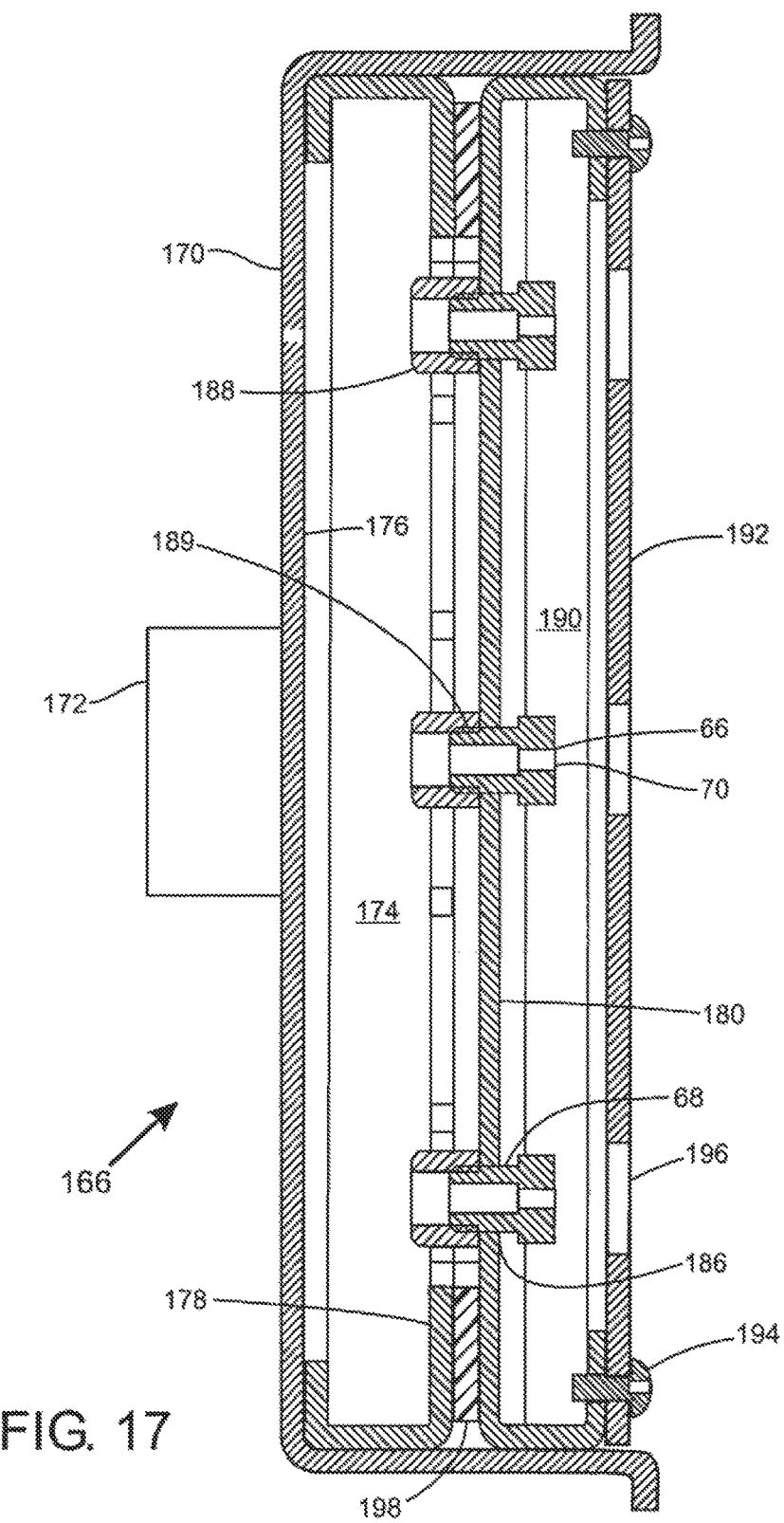
FIG. 17 is a side cross sectional view of the embodiment of FIG. 15 taken on line 17-17 of FIG. 15 illustrating a box manifold.
Figure 18:
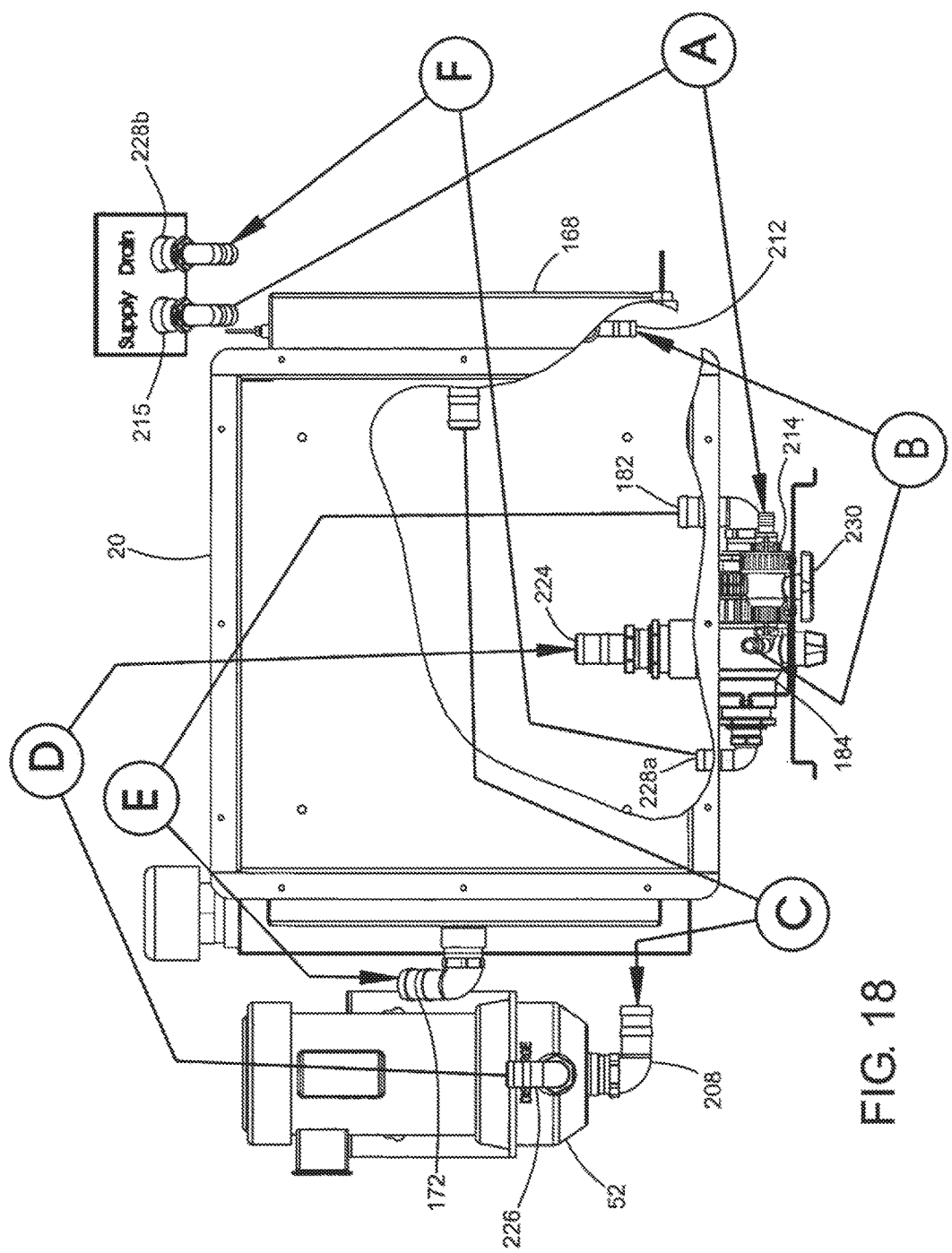
FIG. 18 is a top view of the embodiment of FIG. 15 illustrating liquid flows through a retention tank equipped with a pump and a three-way ball valve.

An alternative embodiment is shown in FIGS. 10-19. In lieu of the manifold assembly 56 used in the embodiment shown in FIGS. 1-9, the retention tank 20 comprises a large opening 164 to accommodate a box manifold 166 having a plurality of nozzle heads 58 for enhanced agitation of the aqueous cleaning solution contained within the interior chamber and a drain box 168 integrally made part thereof for enhanced circulation and removal of aqueous cleaning solution from the retention tank. The box manifold 166 comprises an outer casing 170 having an inlet adapter 172 mounted externally thereto and a pressure box 174 collectively formed by an inner backside 176 of the outer casing as reinforced by an interior reinforcing plate 178 integrally made part of the outer casing and a backing plate 180 used in supporting the nozzle heads 58. As denoted by path E in FIG. 18, the inlet adapter 172 is hydraulically connected to an outlet stem 182 of a three-way ball valve 184. As illustrated in FIGS. 16 and 17, the backing plate comprises a plurality of apertures 186 extending therethrough to receive an equal number of collars 188 each having internal threads 189. In assembled form, each collar is fixedly attached to the backing plate 180 by a bead of weld placed about its outer circumference, with the threaded body 68 of each nozzle head 58 being threadably connected to the collar. Similar to the embodiment shown in FIGS. 1-9 in terms of protecting the nozzle head from suspended matter, each nozzle tip 66 is positioned within a cavity 190 substantially formed by the backing plate and a nozzle plate 192 attached thereto by a plurality of screws 194 and the like. In order to sustain passing of the aqueous cleaning solution into the interior chamber, yet mitigating the passage of small rapid prototype parts and residual support material into the box manifold 166, the nozzle plate comprises a plurality of small apertures 196 each being positionally aligned with each of the nozzle heads, substantially as illustrated in FIGS. 16 and 17. A gasket 198 situated in between the reinforcing and backing plates mitigates leakage of the pressure box 174 and ensures sustained and continuous pressure thereat for passing of the aqueous cleaning solution through the nozzle head 58 and forcibly into the interior chamber 28.

Figure 10:
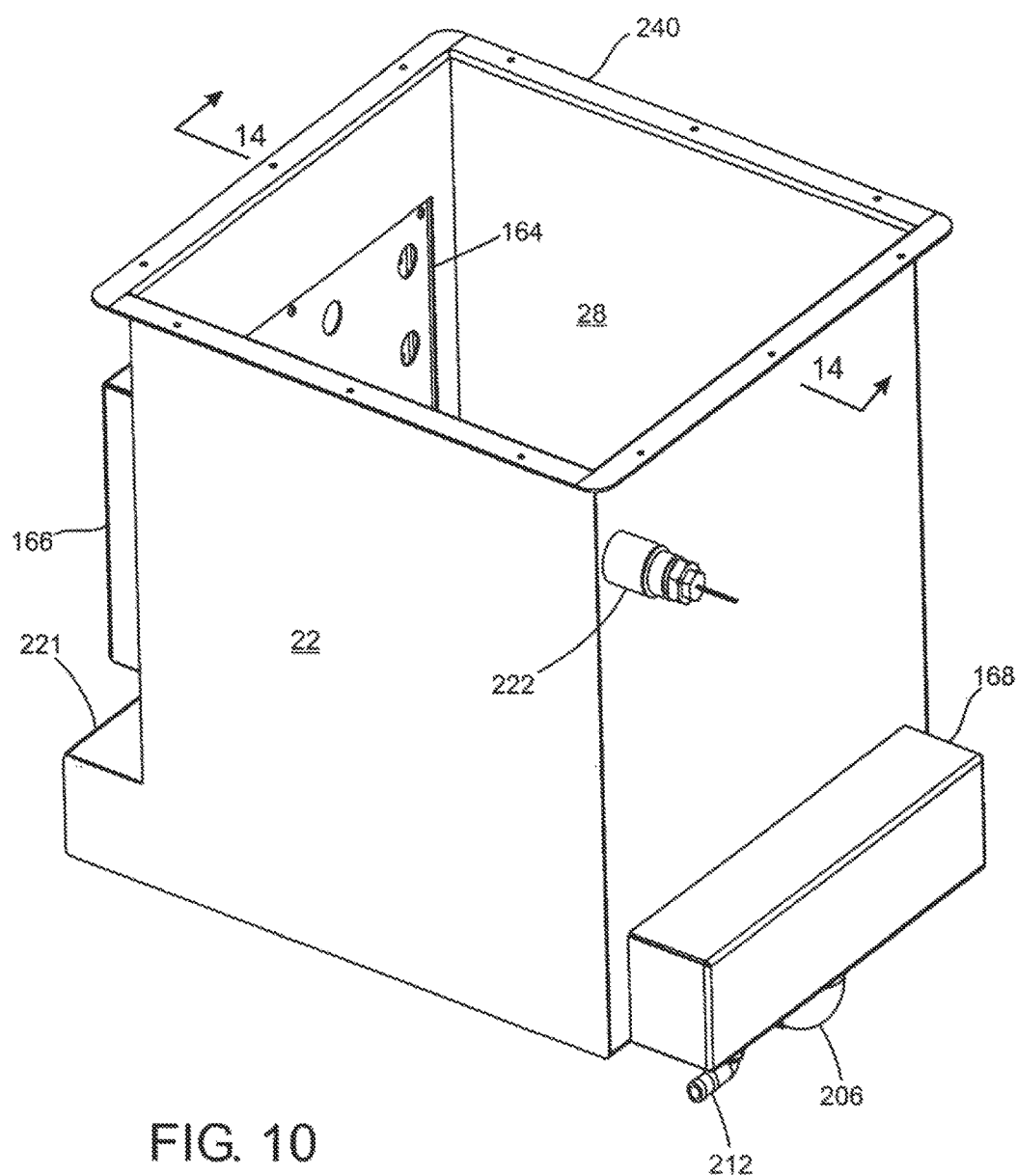
FIG. 10 is a perspective view of another example embodiment illustrating a retention tank equipped with a box manifold.
Figure 11:
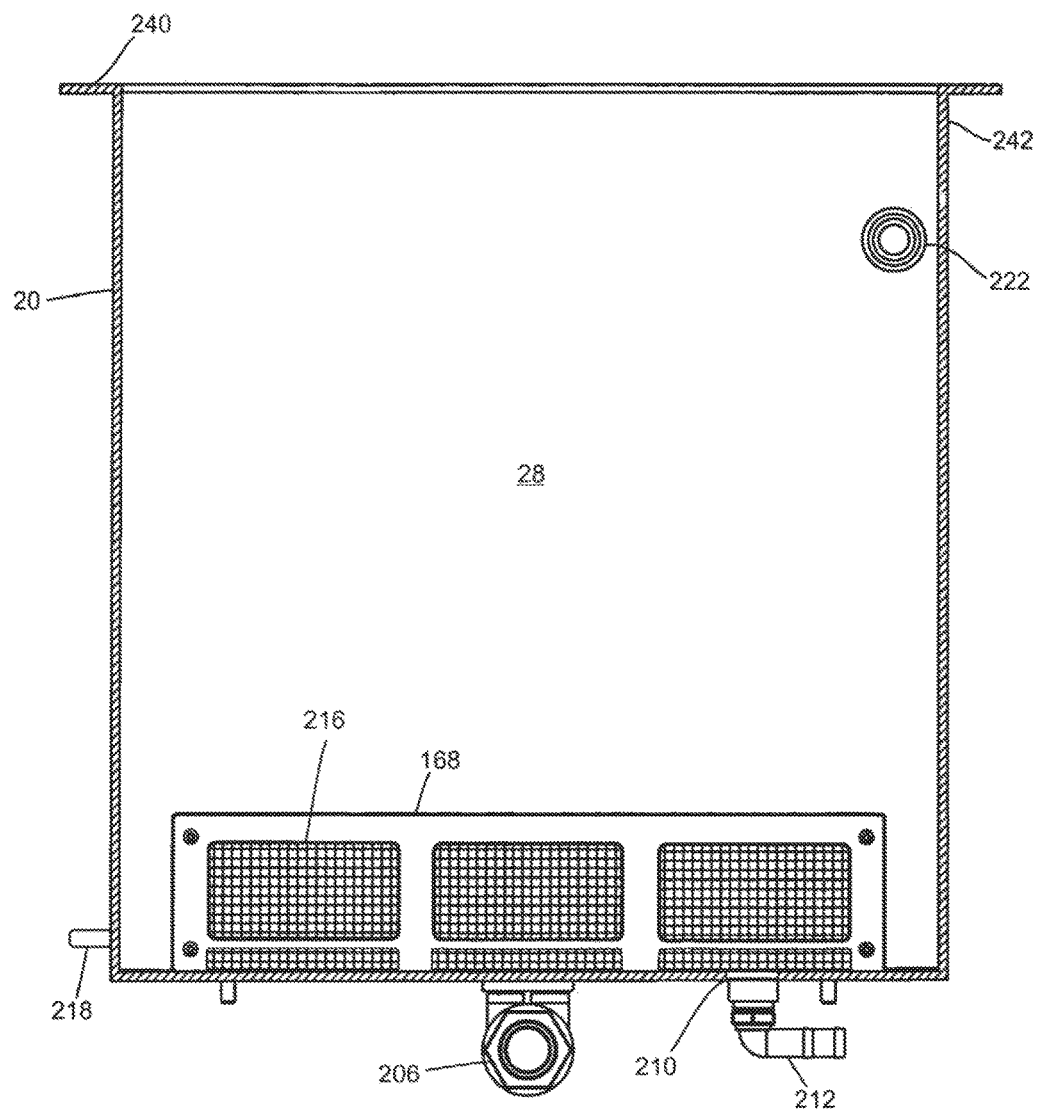
FIG. 11 is a side cross sectional view of the embodiment of FIG. 10 taken on line 11-11 of FIG. 13 illustrating a drain box fitted with an intake side.
Figure 12:
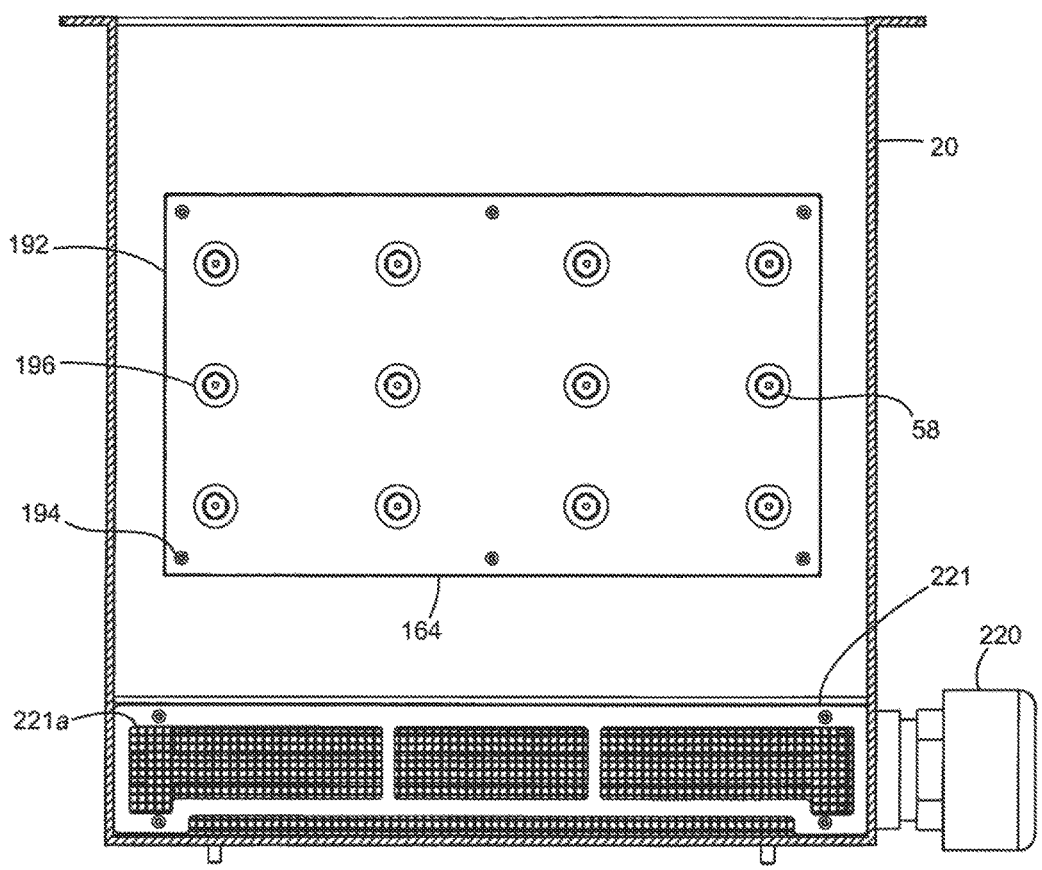
FIG. 12 is a side cross sectional view of the embodiment of the FIG. 13 taken on line 12-12 of FIG. 13 illustrating a box manifold and heating element mounted therebelow and encased in a heat chamber.
Figure 13:
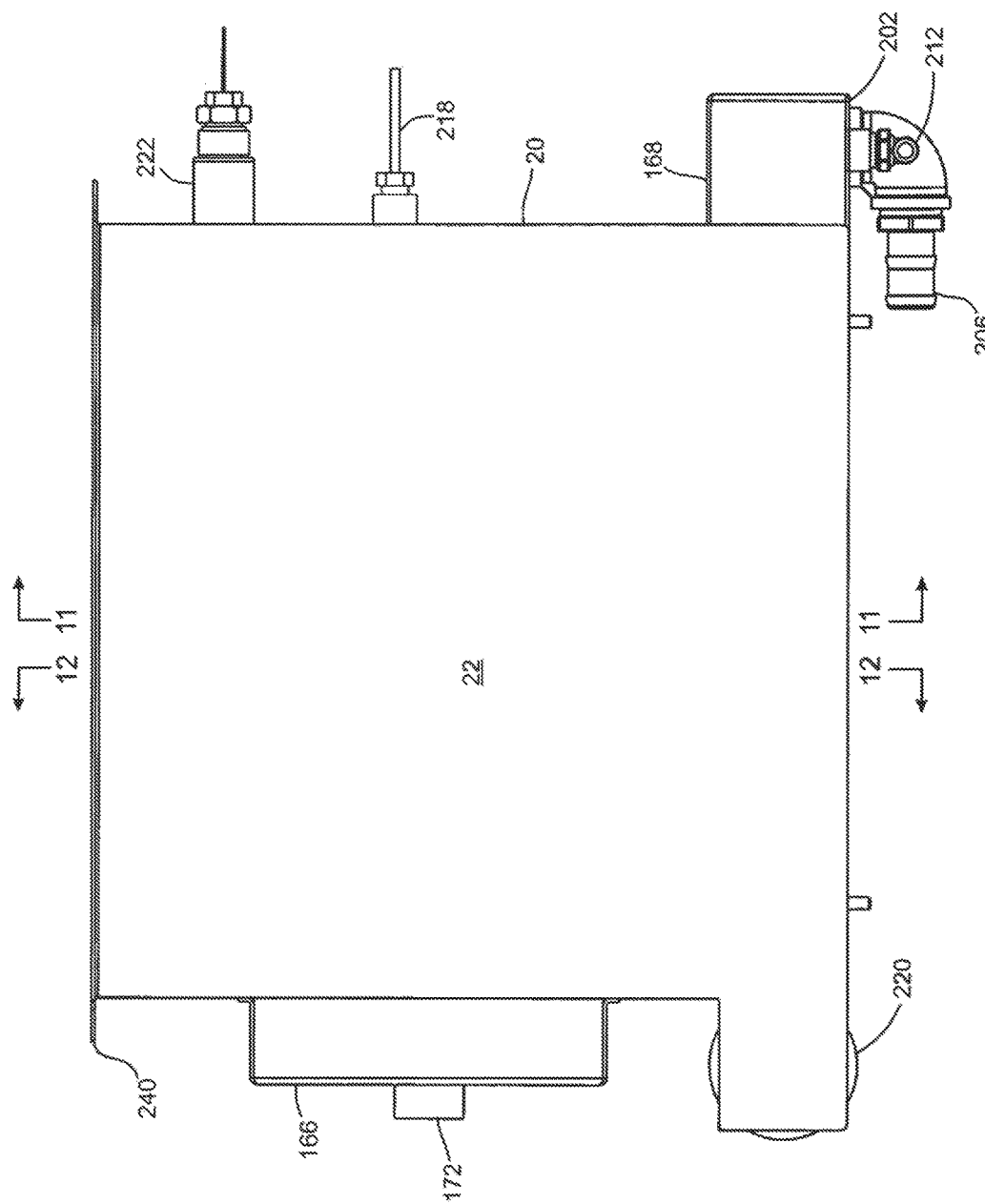
FIG. 13 is a side elevational view of the embodiment of FIG. 10 illustrating a drain box and box manifold mounted to a retention tank.
Figure 14:
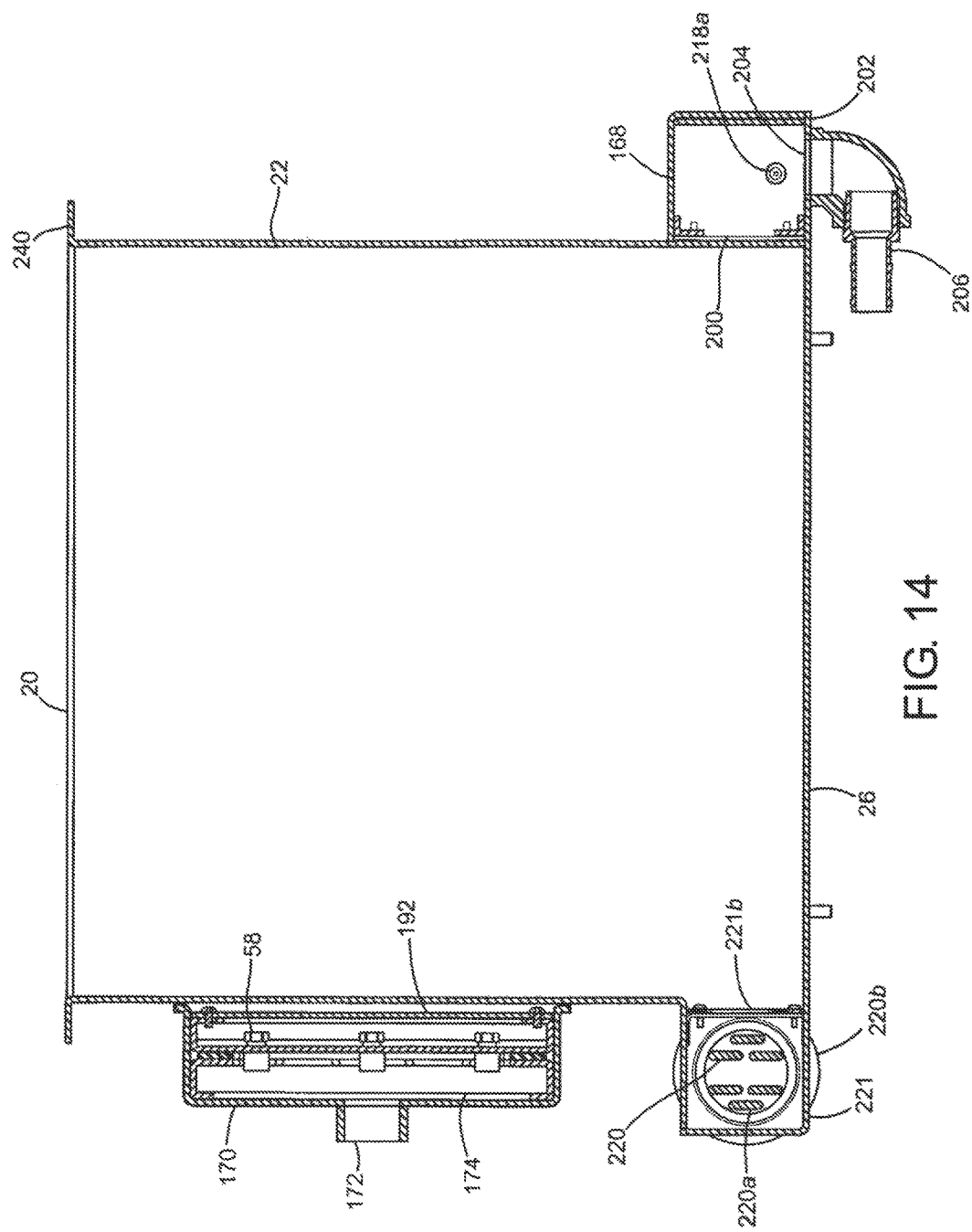
FIG. 14 is a side cross sectional view of the embodiment of FIG. 10 taken on line 14-14 of FIG. 10 illustrating a box manifold and a heating element mounted therebelow and a drain box positioned across therefrom.
Figure 15:
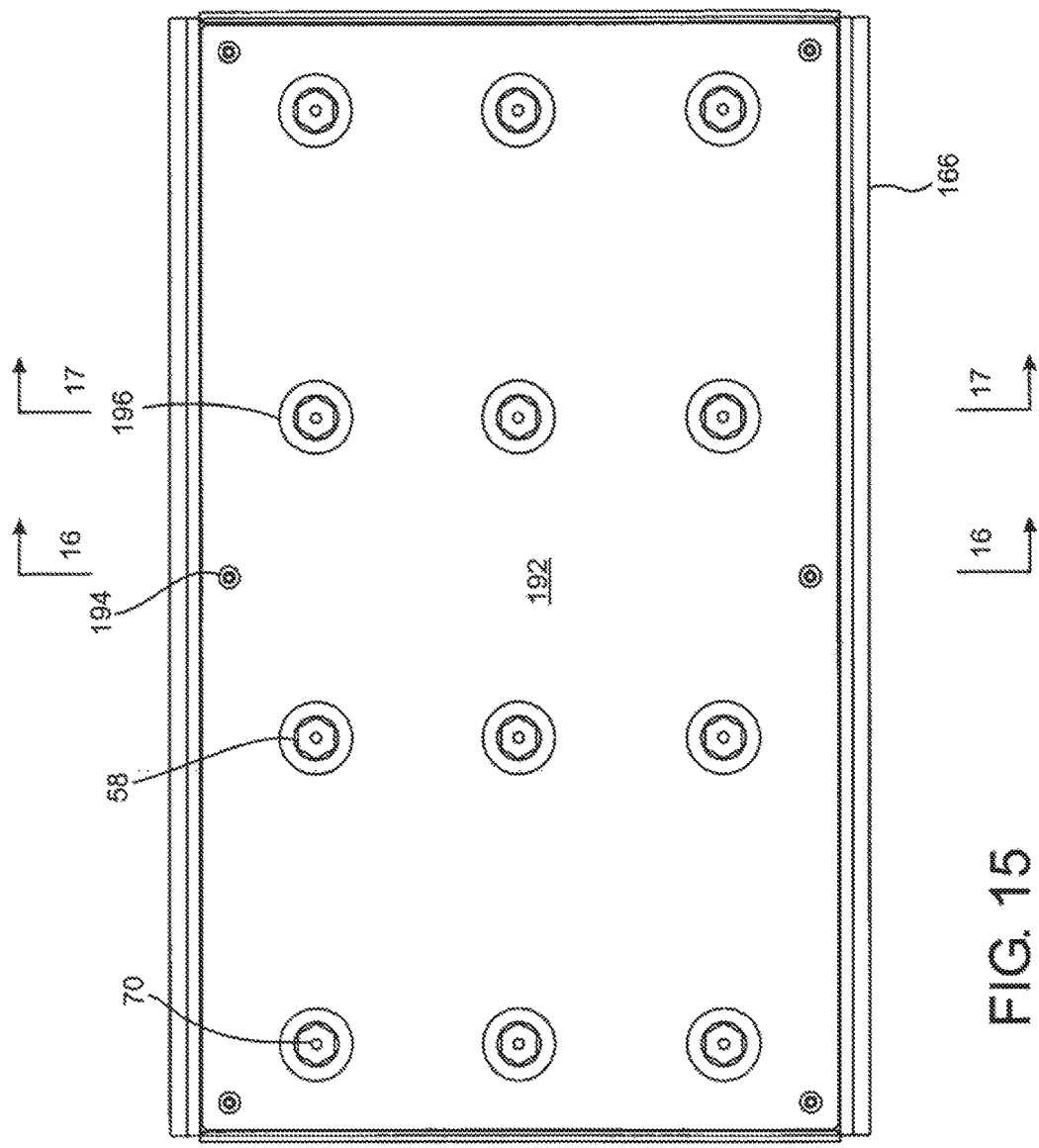
FIG. 15 is a front elevational view of the embodiment of FIG. 10 illustrating a box manifold.
Figure 19:
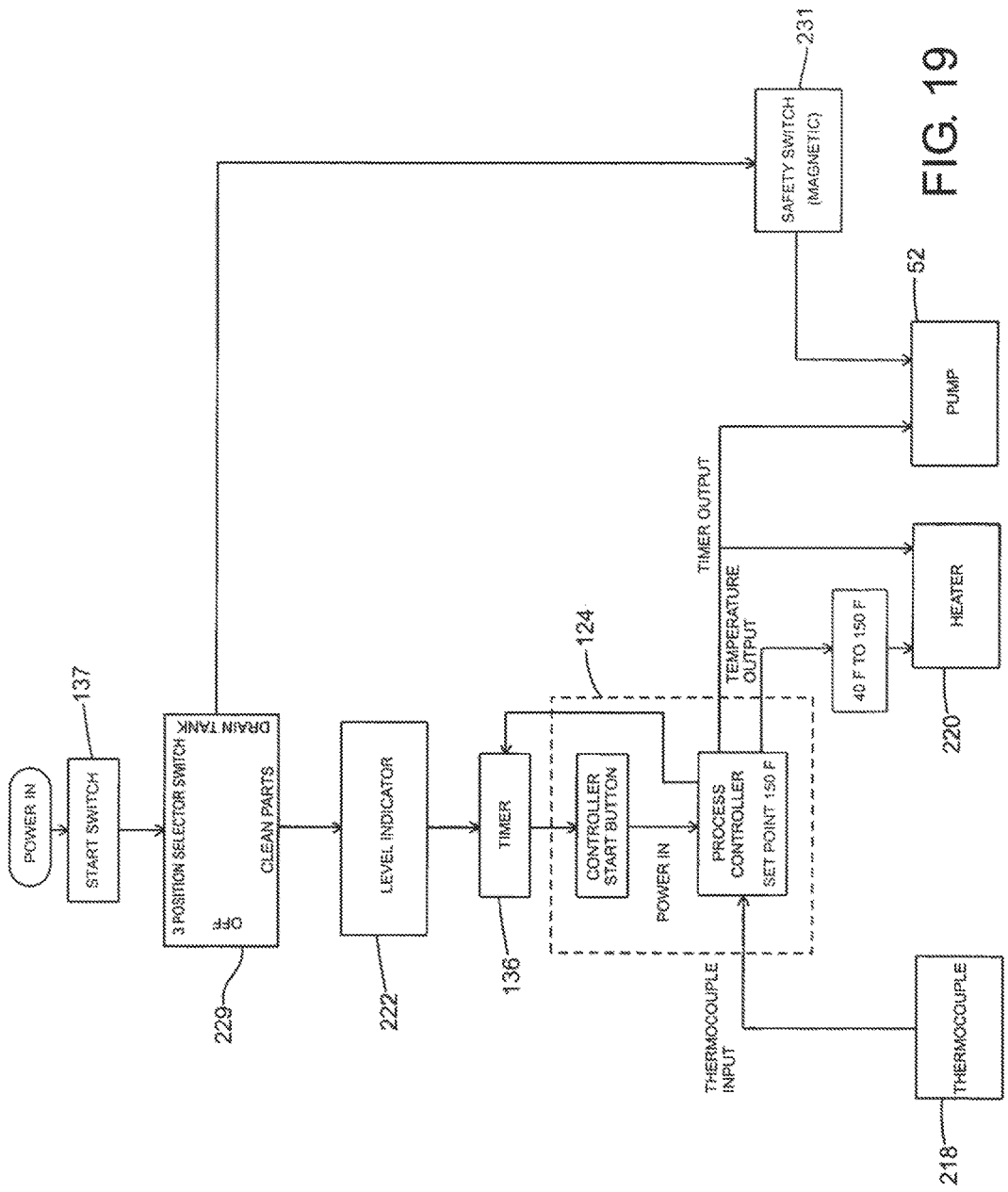
FIG. 19 is a functional block diagram of the embodiment of FIG. 10 illustrating functional relationships between a microprocessor communicatively coupled to a thermocouple, pump, heating element, level indicator, and a three-position selector switch.

Referring now to FIGS. 10 and 11, the drain box 168 generally extends the full width of the side wall of the retention tank 20 and comprises an intake side 200 and a bottom 202 coinciding with the base. An outlet opening 204 extending through the bottom of the drain box receives an outlet line 206 extending therefrom and terminating at an intake side 208 of the pump, as denoted by path C in FIG. 18. A water input opening 210 extending through the bottom 202 suitably receives a fitting 212 for connecting pipe therefrom to a ball valve 214 primarily serving as means for feeding fresh water from an external water source 215 into the drain box 168 and subsequently into the retention tank 20, as denoted by paths A and B in FIG. 18. Like the second end of the intake piping, the intake side 200 is suitably fitted with a screen 216 to inhibit the passage of small rapid prototype parts and residual support material into and through the drain box, pump and ball valve, yet affording continuous passage of the aqueous cleaning solution. Like the embodiment illustrated in FIGS. 1-9, the retention tank 20 of the alternative embodiment comprises a thermocouple 218 having an internal probe 218a positioned within the drain box for measuring the ambient temperature of the aqueous cleaning solution and controlling heat inputs to the microprocessor and a heating element 220 having an internal end 220a of the band type suitably situated near the base and housed in a heat chamber 221 substantially extending about the width of the side wall 22 and placed opposite to the location of the drain box 168, below the box manifold, and an external end 220b communicatively coupled to the microprocessor 124. A screen 221a similar to the one attached on the intake side of the drain box is mounted to an elongate opening 221b of the heat chamber. The retention tank of the embodiment shown in FIGS. 10-22 further comprises a level indicator 222 to the likes discussed for use with the embodiment shown in FIGS. 1-9, particularly of the type substantially capable of measuring the level of the aqueous cleaning solution within the interior chamber 28 to ensure inoperative status of the pump 52 in the event that the solution level is inadequate to support flow through the pump and box manifold and further ensure that each nozzle head is situated below the solution level. As respectively denoted by paths D and F in FIG. 18, the three-way ball valve 184 further comprises an intake stem 224 hydraulically connected to a discharge side 226 of the pump and a drain stem 228a hydraulically connected to an external drain line 228b, which collectively serve in circulating and removing the aqueous cleaning solution in and from the interior chamber 28. Although operation of the embodiment shown in FIGS. 10-22 is substantially similar to the embodiment shown in FIGS. 1-9 in terms of controlling temperature, flow and time functions, the embodiment shown in FIGS. 10-22 further comprises a three-position selector switch 229 having operable modes designated as off, clean parts, and drain tank, as best illustrated in FIG. 19. In the clean parts mode, the embodiment shown in FIGS. 10-22 functions similarly to the preferred embodiment with exception that the user can locally operate the incoming water supply by manually turning a handle 230 made part of the ball valve 214 in the direction of flow, after which the tank fills with the aqueous cleaning solution to a predetermined level. Time inputs are subsequently entered into the microprocessor 124 via the interface controller and the controller start button is activated to power the heating element and pump for a set duration of time. The drain mode primarily serves as means for bypassing the microprocessor 124 insofar to simultaneously activate the pump 58 and a magnetic switch 231 made integrally part of the three-way ball valve to direct flow outwardly from the retention tank via path F in FIG. 18.

Figure 20:
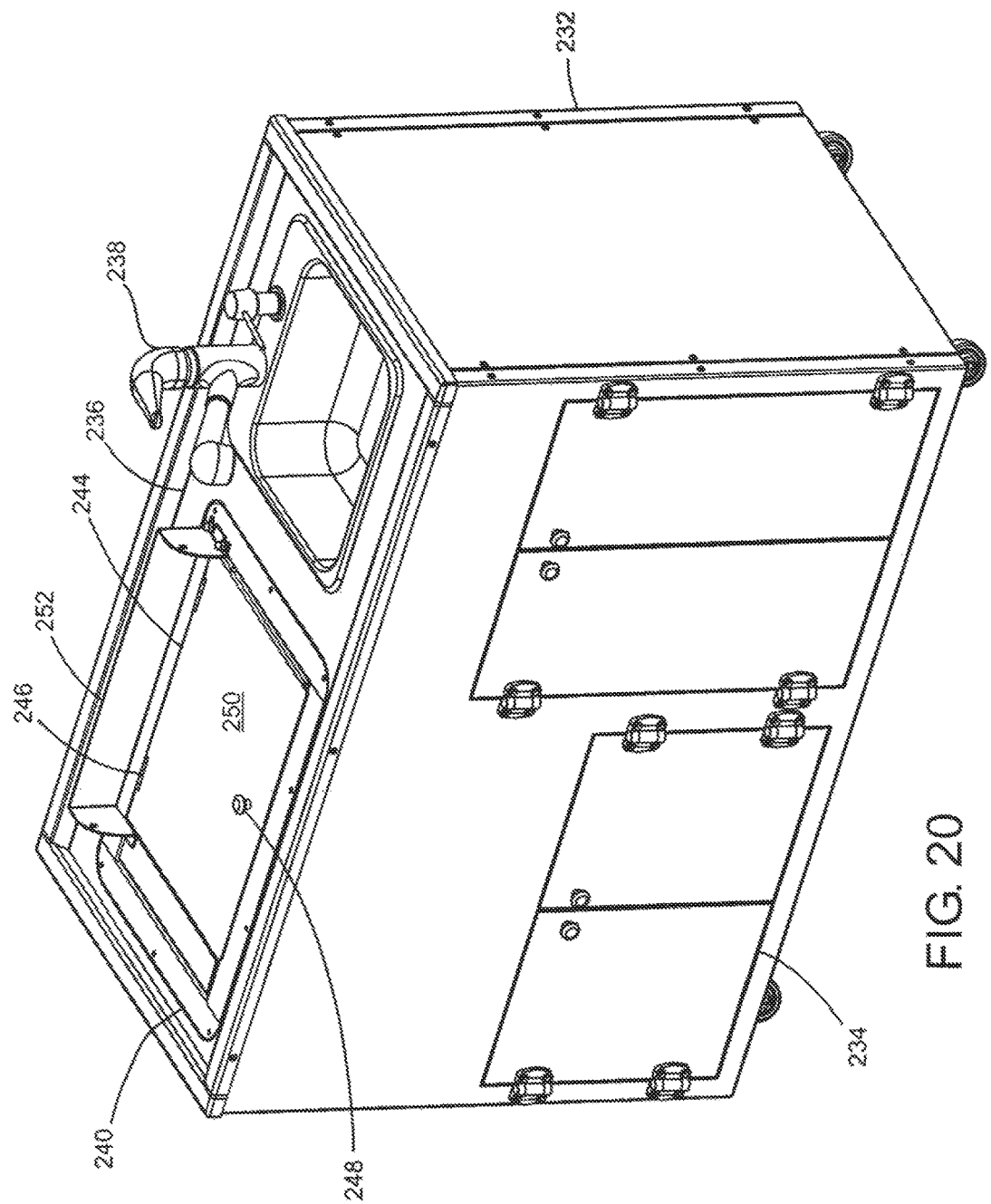
FIG. 20 is a perspective view of the embodiment of FIG. 10 illustrating a storage cabinet housing a retention tank.
Figure 21:
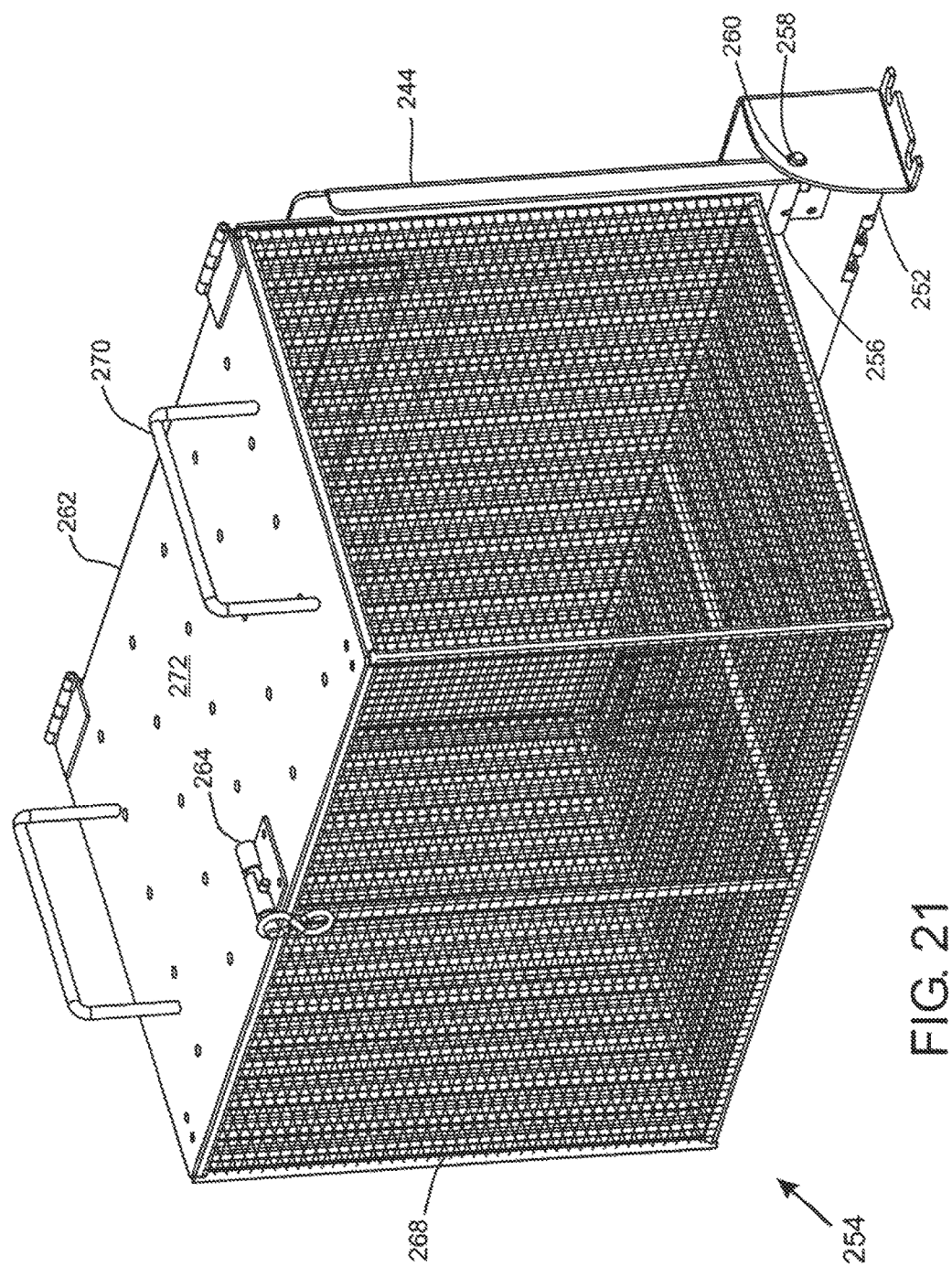
FIG. 21 is a perspective view of the embodiment of FIG. 10 illustrating a drop basket.
Figure 22:
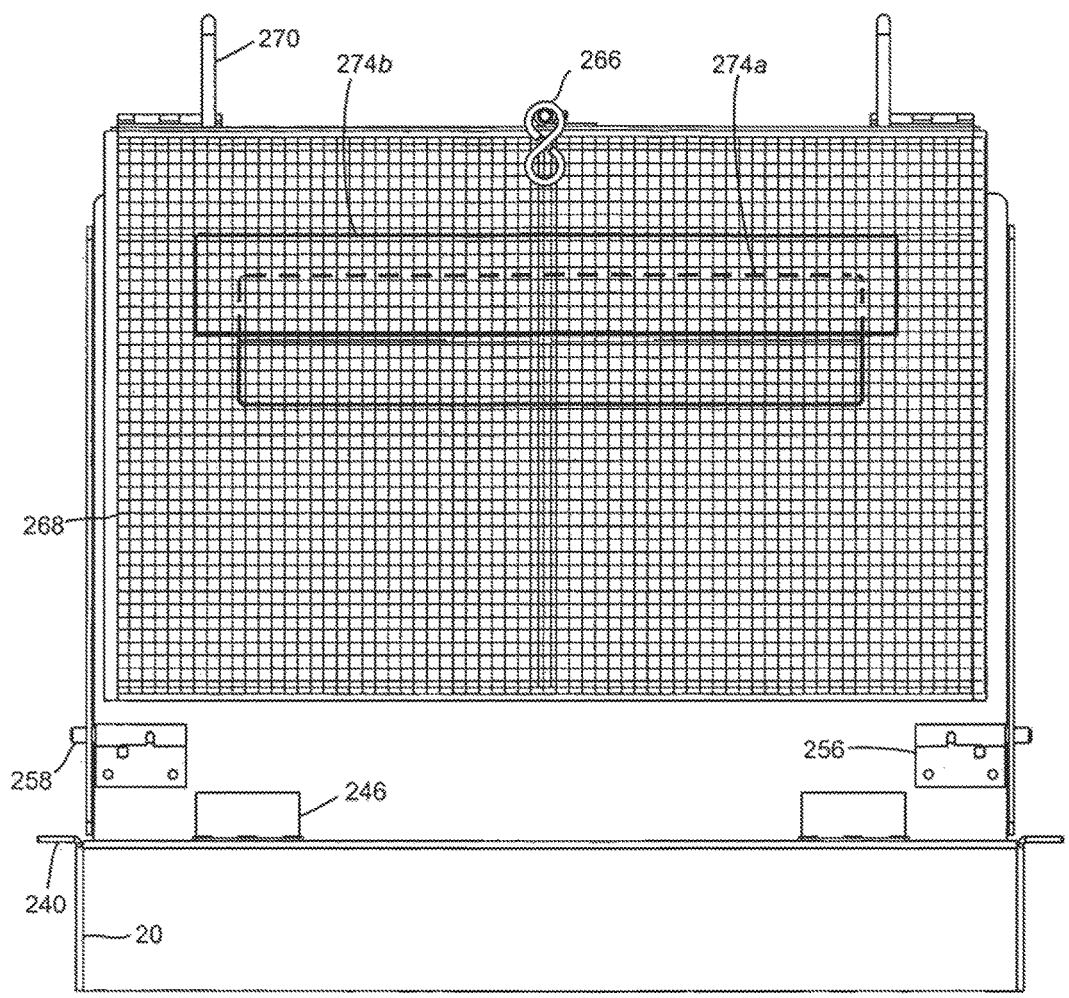
FIG. 22 is a front elevational view of the embodiment of FIG. 10 illustrating a drop box.

Like the embodiment shown in FIGS. 1-9, the embodiment shown in FIGS. 10-22 can be fitted with a work surface 138 having recessed features and means to mitigate evaporative loss of the aqueous cleaning solution during operation. Further, the embodiment shown in FIGS. 10-22 can be housed in a cabinet 14 to the likes described for the embodiment shown in FIGS. 1-9. Alternatively, as shown in FIG. 20, the embodiments shown in FIGS. 1-9 and 10-22 may be suitably housed in a storage cabinet 232 having accessible storage capacity 234, an integral work platform 236 and a localized water source 238 and drain hydraulically connected to an external water supply and drain line, respectively. In this configuration, the retention tank 20 comprises a mounting flange 240 extending outwardly from and along an upper perimeter 242 integrally made part thereof, which substantially serves as means for securing and attaching the retention tank to the integral work platform of the storage cabinet. In mitigating evaporative loss to the likes of the cabinet used for the embodiment shown in FIGS. 1-9, the storage cabinet 232 may comprise a cover 244 having a hinge 246 mounted along its back leading edge and a handle 248 attached to an exterior surface 250 thereof. A backstop 252 fixedly mounted to the work platform 236 suitably serves in controlling the extent to which the cover moves beyond the location of the cover's hinge and provides means for maintaining the vertical orientation of a drop basket 254 alternatively made part of the cover, particularly of the type shown in FIG. 21. A pair of sliding brackets 256 each having a movable slide bar 258 to engage an opening 260 extending through an end wall of the back stop serves as means for locking the cover to the back top 252 in a substantial vertical orientation. The drop basket 254, as shown in FIGS. 21 and 22, comprises an overall rectangular configuration having a top lid 262 hingedly attached to one corner thereof and secured in place by a frontal latch 264 engaging a s-shaped member 266 mounted to a front side 268 of the drop basket. A pair of handles 270 mounted to an exterior surface 272 of the top lid 262 serves as means for lifting and lowering the top lid from and to the drop basket 254. Mounting of the drop basket to the cover 244 is primarily accomplished by upwardly and downwardly orientated lip brackets 274a, 274b configured in such a manner to slidably engage and lock with one another. As shown specifically in FIG. 22, the upwardly orientated lip bracket is attached to a backside of the cover 244 and engages the downwardly orientated lip bracket as attached to a backside of the drop basket.

It can be seen from the foregoing that there is provided in accordance with this disclosure a simple and easily operated device, which is particularly suited to operate side-by-side with a rapid prototype parts making machine in an office setting or similarly suited environment. The support removal apparatus 10 is completely functional in removing water soluble supports efficiently from rapid prototype parts given suitable operability in terms of aqueous cleaning solution type and concentration, agitation, and temperature.

The components comprising the support removal apparatus may be fabricated from a variety of materials, providing such selection or use of materials possess the capacity to withstand premature corrosion given the presence and use of an alkaline aqueous cleaning solution, notably falling within an applicable pH range of 8-11. Accordingly, it may be desirable to construct the retention tank 20, work surface 138, lid 148 and nozzle heads 58 from 316 stainless steel, pipe and fittings from a polymeric material such as polyamide (PA) or acrylonitrile-butadiene-styrene (ABS), and cabinet 14 and storage cabinet 232 from a lower grade stainless steel. It is noted herein that the retention tank, nozzle head, work surface, and integral work platform may be alternatively fabricated from materials to lessen the overall weight of the support removal apparatus yet maintaining sufficient resistance to corrosion, such as polypropylene, polyoxymethylene, polyphenylene, ABS, or PA. Similarly, the pump, thermocouple, heating element, and level indictor, particularly exposed operable components of each, are fabricated from a high grade stainless steel (316) or coated with an impervious, corrosive-resistant material such as epoxy.

Figure 23:
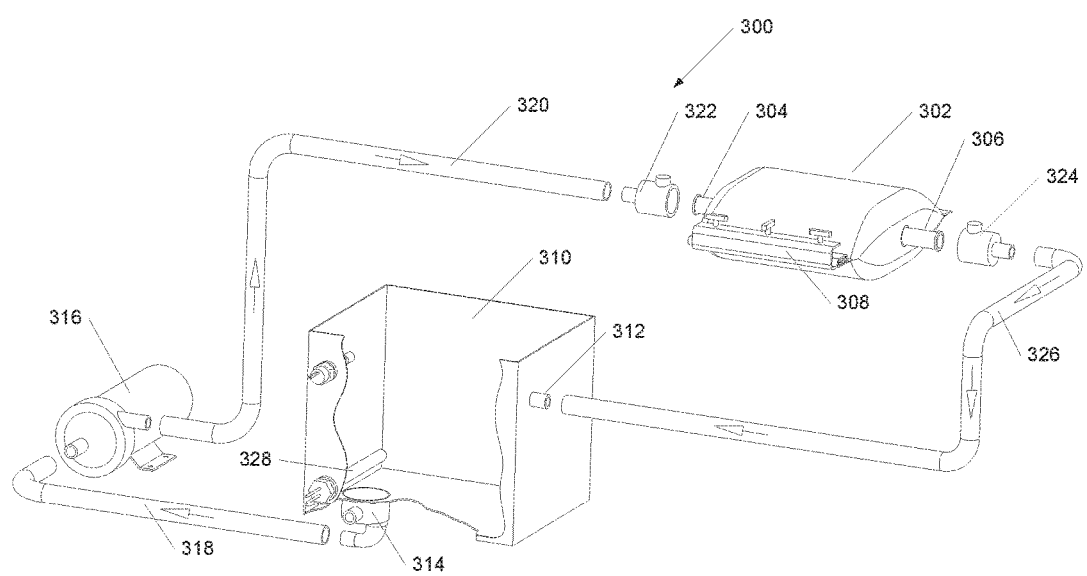
FIG. 23 is a system diagram illustrating a system for removing soluble support material from a rapid prototype part according to another embodiment.

According to another embodiment, a container can be used to improve the efficiency of the process of removing soluble support material from a rapid prototype part. FIG. 23 is a system diagram illustrating a system 300 for removing soluble support material from a rapid prototype part using an aqueous cleaning solution. The system 300 includes a container 302, which is discussed in greater detail below in connection with FIGS. 24-28. Another implementation of the container 302 is depicted in and discussed below in connection with FIG. 29. The container 302 defines a volume for receiving the rapid prototype part (not shown in FIG. 23) and has an inlet port 304 and an outlet port 306. A sealing arrangement 308, such as a clamp, substantially seals the container 302 after the rapid prototype part has been placed inside the container 302. With the container 302 substantially sealed in this way, the aqueous cleaning solution is substantially prevented from leaking out of the container 302 as it flows through the container 302.

A basin 310 stores the aqueous cleaning solution. By way of example and not limitation, the aqueous cleaning solution may comprise alcohol, sodium hydroxide, or potassium hydroxide. The basin may be formed of any material that is compatible with the aqueous cleaning solution, such as a polymer or a metal. The basin 310 has an inlet port 312 and a drain basket 314. A pump 316 is connected in fluid communication with the basin 310. In operation, the pump 316 pumps the aqueous cleaning solution from the basin 310 through tubing 318 and 320 and into the container 302 via the inlet port 304, which is coupled to the tubing 320, and thus to the pump 316, by a connector 322. The connector 322 may be implemented as a quick coupler type connector. The tubing 318 and 320 and the connector 322 may be formed from any material that is compatible with the aqueous cleaning solution, i.e., by any material that will not be damaged by exposure to the aqueous cleaning solution.

The aqueous cleaning solution removes the soluble support material from the rapid prototype part and is discharged from the container 302 through the outlet port 306. The outlet port 306 is connected in fluid communication with the basin 310 via a connector 324 that is coupled to outlet port 306 and to tubing 326, which may be formed from any material that is compatible with the aqueous cleaning solution. The connector 324 may be implemented as a quick coupler type connector. The aqueous cleaning solution flows through the tubing 326 and reenters the basin 310 through the inlet port 312. After the aqueous cleaning solution reenters the basin 310, it is once again pumped out of the basin 310 by the pump 316 through the drain basket 314. The drain basket 314 may incorporate a mesh screen or other filter for filtering out particles of soluble support material that were removed from the rapid prototype part.

In some embodiments, the aqueous cleaning solution is heated to improve its efficiency in removing soluble support material. For example, the aqueous cleaning solution may be heated to a temperature between 50 degrees Fahrenheit and 200 degrees Fahrenheit. Heating the solution can be accomplished using a heater 328 disposed within the basin 310. It will be appreciated by those of skill in the art that, if the basin 310 is formed from a material having a relatively low melting point, such as certain polymers, it may be desirable to employ a circulation heater (not shown) disposed around, for example, tubing 326, in lieu of the heater 328 disposed within the basin 310 in order to avoid damaging the basin 310.

Figure 24:
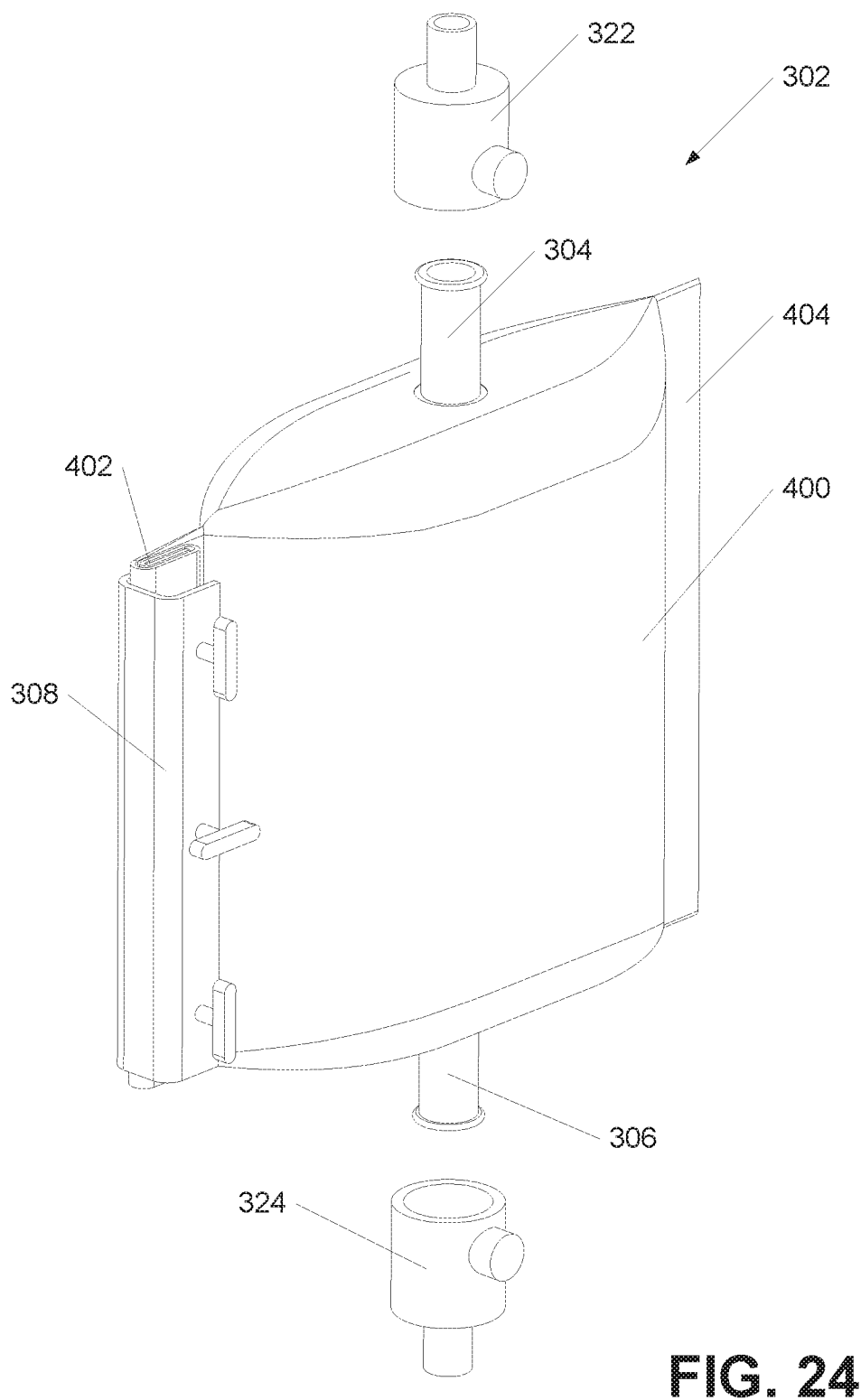
FIG. 24 is a perspective view of a container forming part of the system of FIG. 23 according to yet another embodiment.
Figure 25:
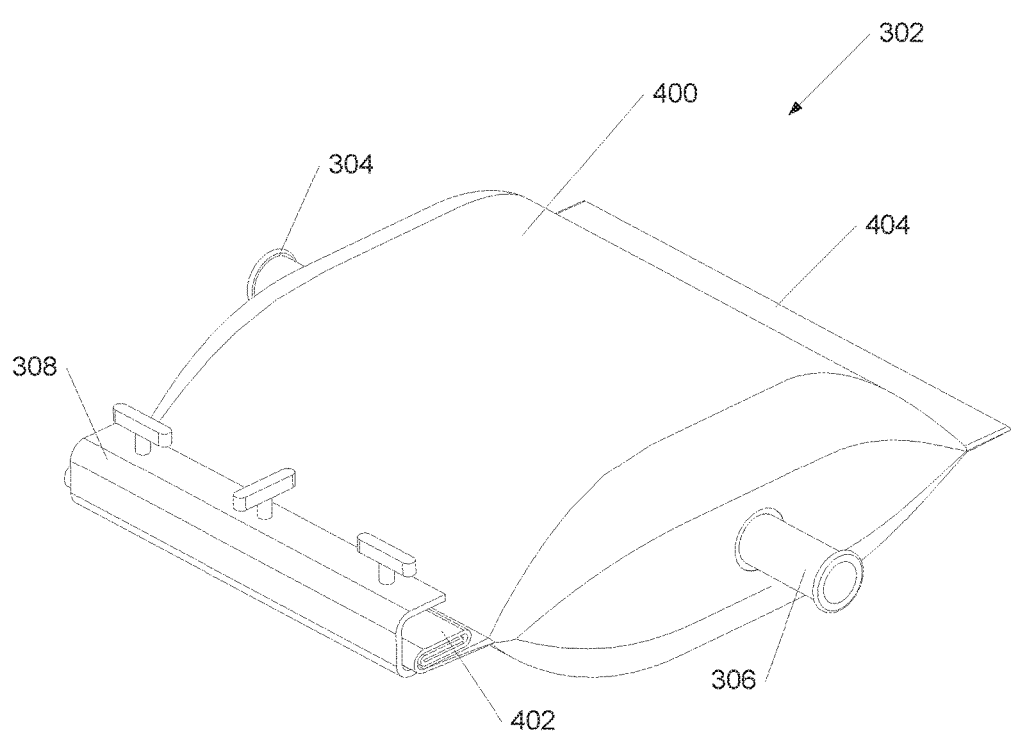
FIG. 25 is another perspective view of the container of FIG. 24.

FIG. 24 and FIG. 25 are perspective views of one example implementation of the container 302. The container 302 includes a liner 400 that has an exterior surface. The liner 400 may be formed from any of a variety of chemically resistant materials, i.e., materials that will not be damaged by the aqueous cleaning solution. By way of example and not limitation, the liner 400 may be formed from nylon, a polyolefin such as polypropylene, or a fluoropolymer such as PTFE, TEFLON®, or FEP. It is desirable that the liner 400 is resistant both to the chemicals used in removing the soluble support material or substrate and to the temperatures involved in the process. It is also desirable that the liner 400 is degradable. Alternatively, the liner 400 could incorporate less chemically resistant materials, such as ABS or PVC. In such embodiments, the liner 400 would degrade after a number of uses and would need to be replaced.

In the embodiment of FIGS. 24 and 25, the liner 400 is expandable to define a mouth portion 402 at one end and is heat sealed at the opposite end 404. When the liner 400 is expanded, the liner 400 defines a volume into which the rapid prototype part (not shown in FIG. 24) can be received. After the rapid prototype part is received in the container 302, the sealing arrangement 308 substantially seals the mouth portion 402 so that the aqueous cleaning solution is substantially prevented from leaking out of the mouth portion 402.

In the embodiment shown in FIG. 24, the inlet port 304 and the outlet port 306 are heat sealed on the other two sides of the exterior surface of the liner 400. Alternatively, the inlet port 304 and the outlet port 306 may be affixed to or formed on the exterior surface of the liner 400 by any suitable process, including, for example, insert molding. Both the inlet port 304 and the outlet port 306 are in fluid communication with the volume defined when the liner 400 is expanded. In operation, the aqueous cleaning solution is introduced into the volume through the inlet port 304, which is in fluid communication with the basin 310 storing the aqueous cleaning solution via the tubing 318 and 320 and the connector 322. In one example embodiment, the aqueous cleaning solution is supplied to the inlet port 304 at a pressure of approximately 3-60 pounds per square inch (psi). The aqueous cleaning solution removes the soluble support material from the rapid prototype part and is discharged from the container 302 through the outlet port 306, which is connected to the tubing 326 via the connector 324. As the aqueous cleaning solution flows out of the container 302, it may carry the removed soluble support material with it through the tubing 326 back to the basin 310, where the removed soluble support material is filtered by the drain basket 314 before the aqueous cleaning solution is pumped back to the container 302.

Figure 26:
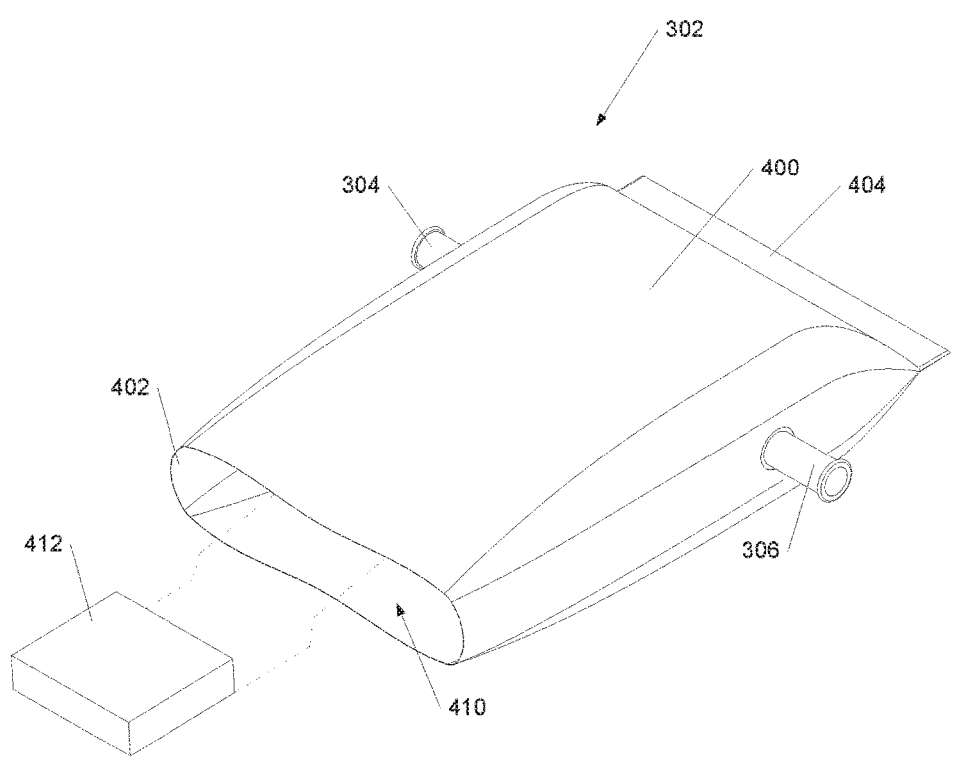
FIG. 26 is a perspective view of the container of FIGS. 24-25 illustrating an open mouth portion.
Figure 27:
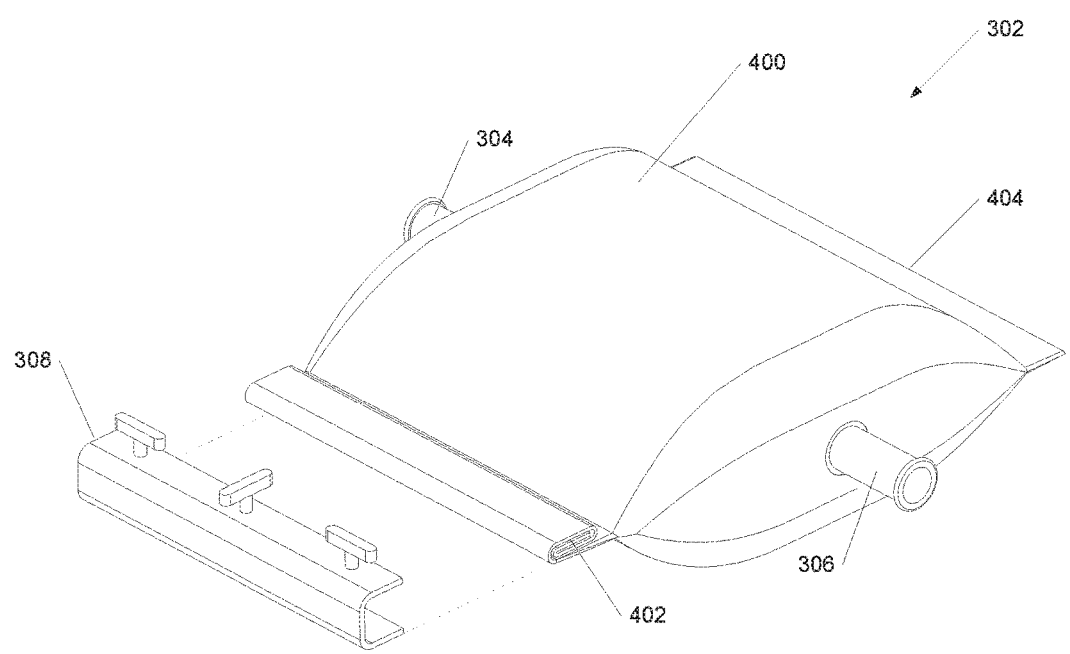
FIG. 27 is a perspective view of the container of FIGS. 24-25 with a sealing arrangement shown as detached from the container.

FIGS. 26 and 27 are additional perspective views of the container 302 of FIGS. 24-25. FIG. 26 shows the liner 400 and the mouth portion 402 having been expanded to define a volume 410 for receiving a rapid prototype part 412 having aqueous soluble support material deposited on it. FIG. 27 illustrates the sealing arrangement 308 as detached from the container 302. It will be appreciated by those of skill in the art that the container 302 may be sealed by folding or crimping the mouth portion 402 of the liner 400 and engaging the sealing arrangement 308.

Figure 28:
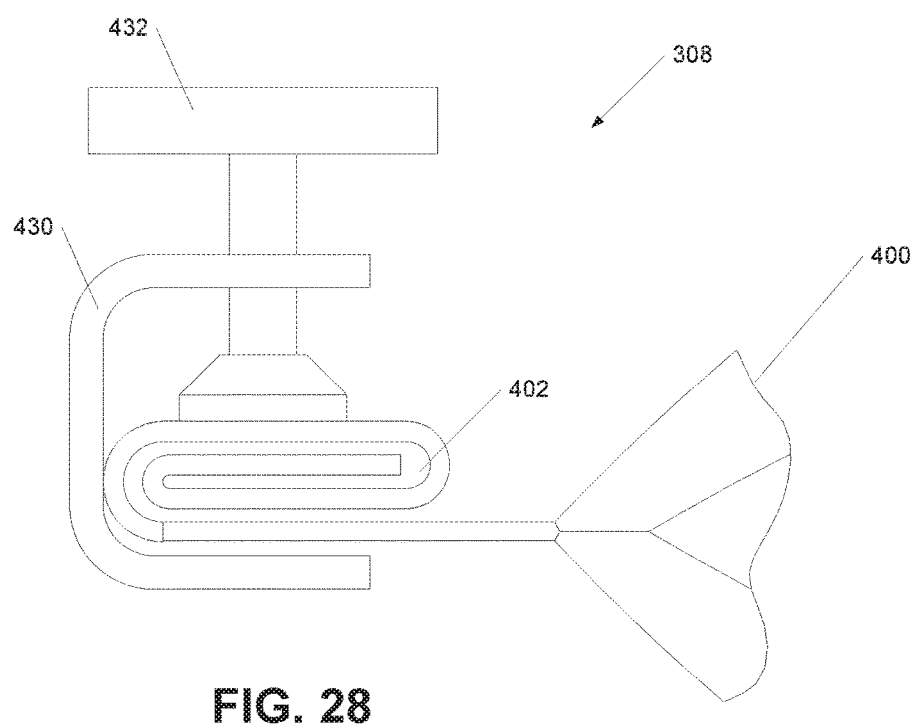
FIG. 28 is a side view of one example embodiment of the sealing arrangement.

FIG. 28 is a side view of one example embodiment of the sealing arrangement 308. In the embodiment of FIG. 28, the sealing arrangement 308 is implemented as a clamp. The clamp has a clamp body 430 into which the folded or crimped mouth portion 402 of the liner 400 is placed. After the mouth portion 402 has been placed in the clamp body 430, one or more thumbscrews 432 are tightened to compress the folded or crimped mouth portion 402 and thereby substantially seal the mouth portion 402. In this way, a substantially airtight and watertight seal is provided, and leakage of the aqueous cleaning solution from the mouth portion 402 is substantially prevented. While a single thumbscrew 432 is visible in the side view of FIG. 28, it will be appreciated that multiple thumbscrews 432 may be employed, as shown in FIGS. 23-25, 27, and 29.

The efficiency of the cleaning process by which the aqueous cleaning solution removes the soluble support material from the rapid prototype part is affected by a number of factors, including, but not limited to, the concentration of the aqueous cleaning solution, the temperature of the aqueous cleaning solution, the duration for which the rapid prototype part is subjected to the cleaning process, the flow rate at which the aqueous cleaning solution is supplied to the container 302, and any pressure differential between the inlet port 304 and the outlet port 306.

As mentioned above, one factor affecting the efficiency of the cleaning process is the existence of a pressure differential between the inlet port 304 and the outlet port 306. The pressure differential is a function of the difference in cross-sectional area between the inlet port 304 and the outlet port 306. No effect on efficiency has been observed in embodiments in which the diameter, and therefore the cross-sectional area, of the outlet port 306 is larger than that of the inlet port 304. Surprisingly, however, when the diameter of the outlet port 306 is the same size as or smaller than the diameter of the inlet port 304, an improvement in efficiency of 100%-300% has been observed; in such embodiments, the cleaning process has been observed to be completed substantially more quickly relative to embodiments in which the outlet port 306 is larger than the inlet port 304. It is hypothesized that when the outlet port 306 is smaller than the inlet port 304, pressure is created inside the container 302, resulting in faster agitation of the soluble support material from the rapid prototype part.

Figure 29:
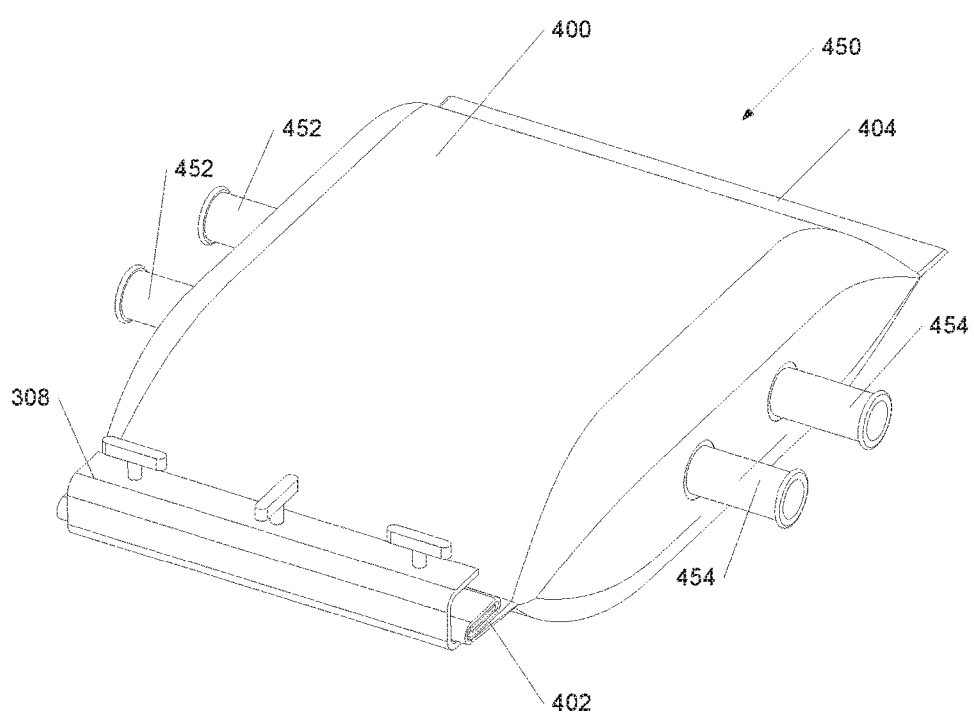
FIG. 29 is a perspective view of a container having multiple inlet ports and multiple outlet ports according to still another embodiment.

Another way of increasing the effective cross sectional area of the inlet port 304 or the outlet port 306 is to employ multiple inlet ports 304 or multiple outlet ports 306, or both. FIG. 29 is a perspective view of a container 450 having multiple inlet ports 452 and multiple outlet ports 454 according to still another embodiment. The container 450 may be substituted for the container 302 in the system 300, with appropriate modifications to the system 300 to accommodate the multiple inlet ports 452 and/or multiple outlet ports 454. For example, additional tubing similar to tubing 320 and 326 and additional connectors similar to connectors 322 and 324 may be required. Alternatively, manifolds may be used to connect multiple inlet ports 452 or multiple outlet ports 454 to a single connector or tubing. It will be appreciated that, while FIG. 29 depicts two inlet ports 452 and two outlet ports 454 and FIGS. 23-28 depict a single inlet port 304 and a single outlet port 306, some embodiments may employ a single inlet port and multiple outlet ports or, conversely, multiple inlet ports and a single outlet port. In short, any number of inlet ports and outlet ports, in any combination, may be employed.

The embodiments described herein may result in certain advantages. For instance, it has been observed that under otherwise comparable conditions, e.g., similar temperature conditions and similar concentrations of aqueous cleaning solution, the time to remove soluble support material from a rapid prototype part can be reduced from, for example, five or more hours to approximately 30 minutes. This increased efficiency can result in increased throughput. Further, the container used in the process is relatively easy to manufacture and assemble and can be retrofitted on existing equipment. Accordingly, little, if any, modification is required to existing equipment.

Certain components of a system, e.g., the system 300, may generate heat through, for example, friction of liquids moving through the system, cavitation, and/or other mechanisms. Processes involving thermoplastic materials may not be adversely affected by, and may benefit from, the generated heat.

Some prototyping processes involve the deposition of photopolymer layers. For example, successive photopolymer layers may be deposited and cured using ultraviolet light. Heat generated by mechanisms such as friction and cavitation may adversely affect photopolymers, which may be heat sensitive. For example, excessive heat may cause photopolymers to exhibit relative motion, deformation, and/or crazing. Accordingly, in prototyping processes involving photopolymers, temperature control to prevent excessive heating may promote prototypes that are less susceptible to such adverse effects.

Figure 30:
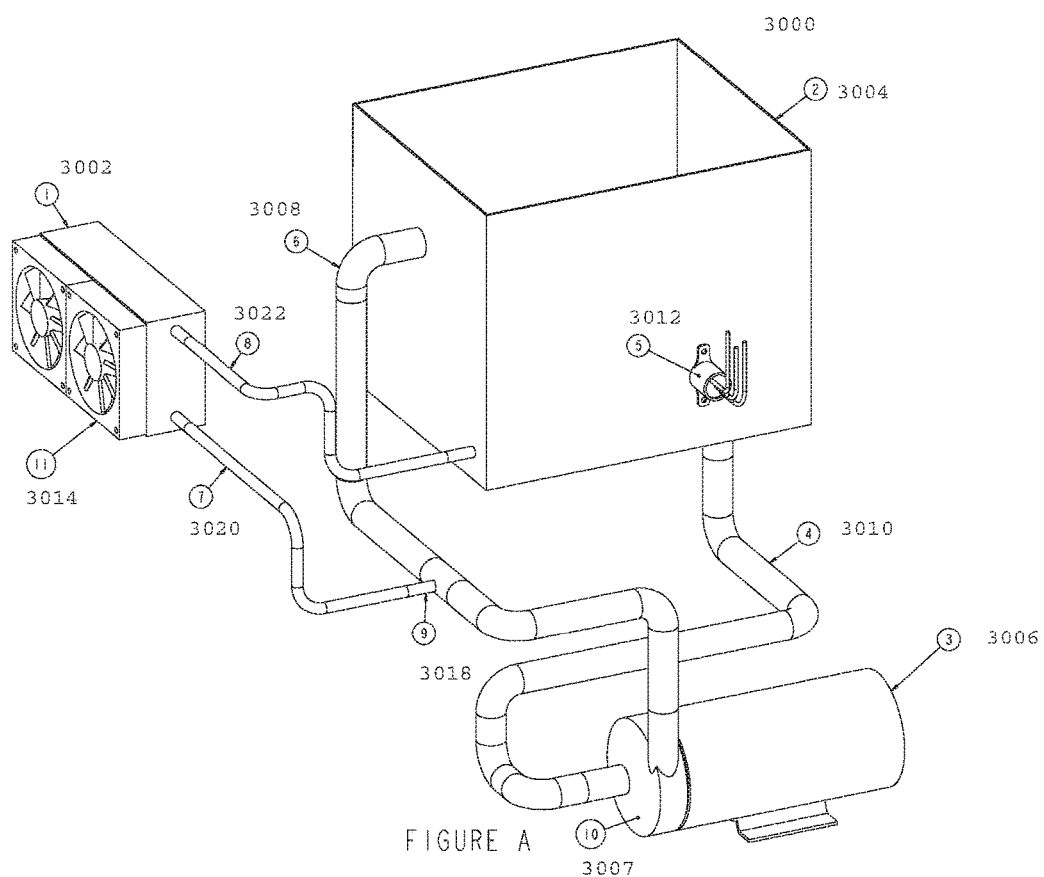
FIG. 30 is a perspective view of a temperature-controlled system according to an embodiment.
Figure 31:
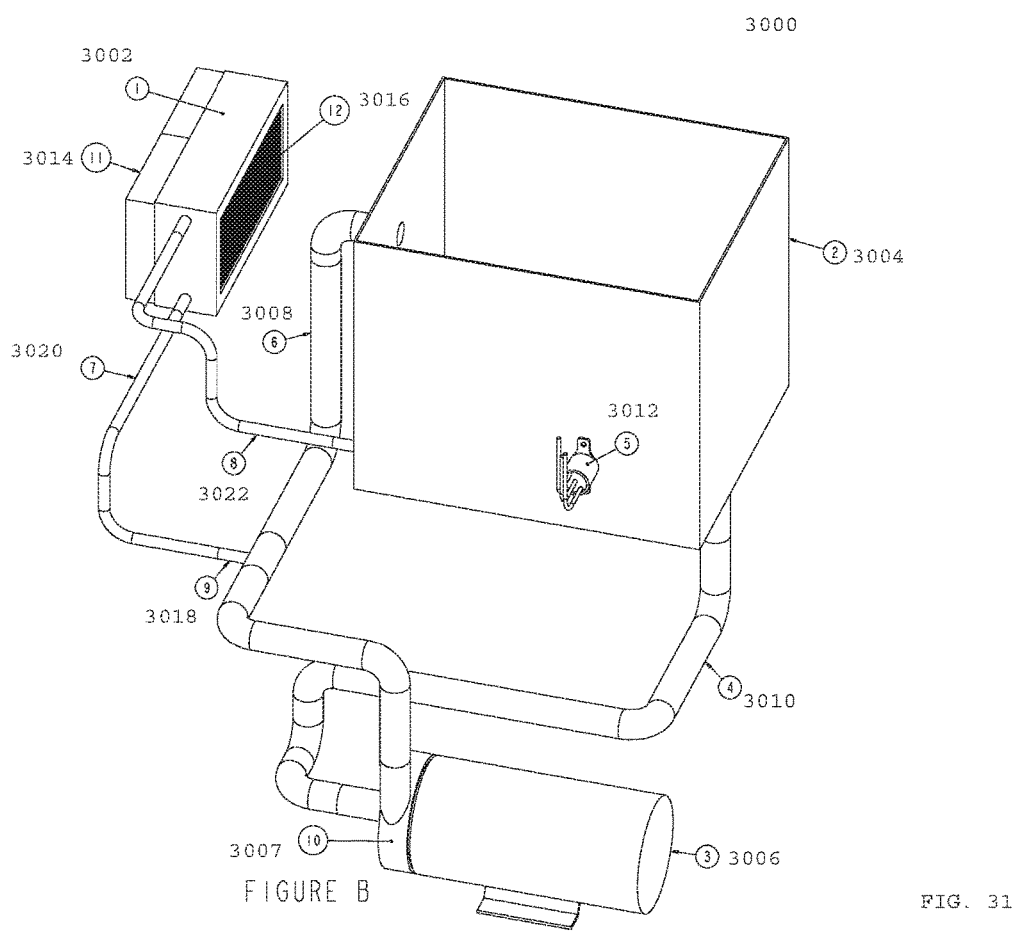
FIG. 31 is a plan view of the temperature-controlled system of FIG. 30.
Figure 32:
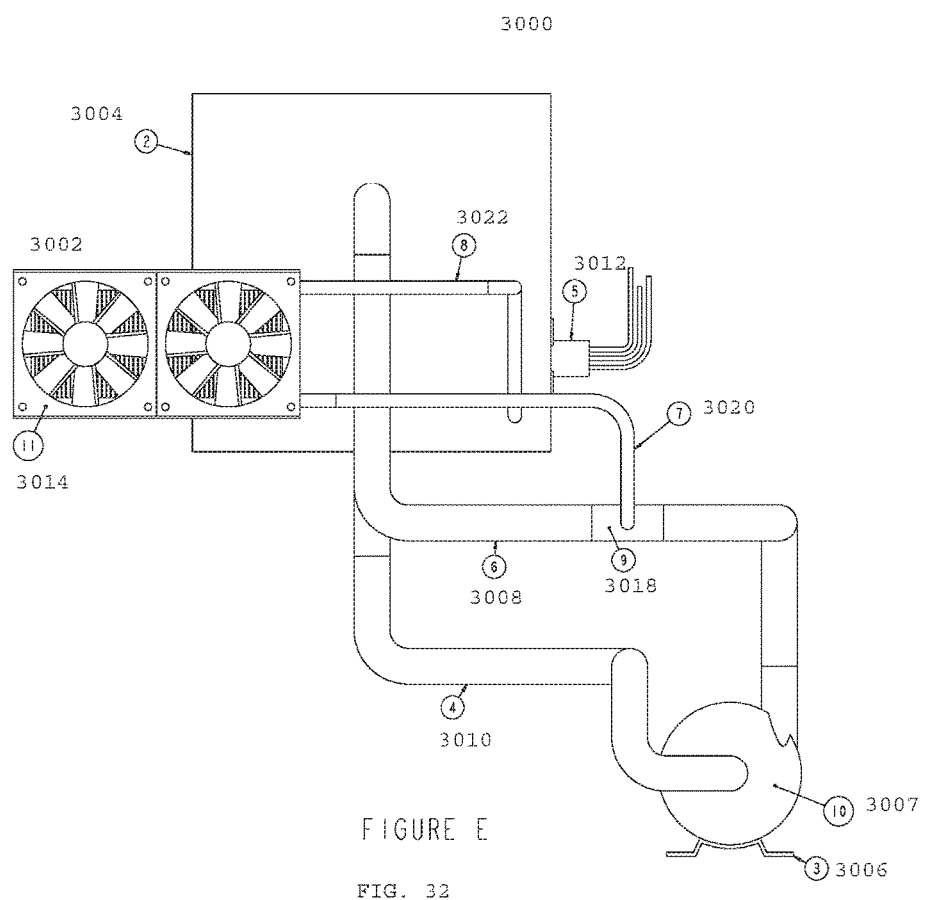
FIG. 32 is another plan view of the temperature-controlled system of FIG. 30.

FIG. 30 is a perspective view of an example temperature-controlled system 3000 according to an embodiment. FIG. 31 is a plan view of the temperature-controlled system 3000. FIG. 32 is another plan view of the temperature-controlled system 3000.

A cooling module 3002 may be in fluid communication with a container 3004, such as a tank. The cooling module 3002 may be implemented, for example, as a heat exchanger that cools fluid using fans. In another example, the cooling module 3002 may use a refrigerant to cool fluid.

A pump 3006 may include a pump impeller housing 3007 and may deliver fluid, such as an aqueous cleaning solution, to the container 3004 via a pressure hose 3008 and may recover fluid that has been used, for example, via a suction hose 3010. The pressure in the pressure hose 3008 and/or the suction hose 3010 may be, for example, approximately 10 psi.

A temperature sensor 3012 may sense the temperature of the container 3004, as shown in FIG. 30. The temperature sensor 3012 may be positioned to sense the temperature of another portion of the system 3000, such as the pressure hose 3008 and/or the suction hose 3010. The temperature sensor 3012 may be implemented, for example, as a temperature sensor as disclosed in co-pending U.S. patent application Ser. No. 13/613,775, filed Sep. 13, 2012 and entitled "TEMPERATURE CONTROL APPARATUS," the disclosure of which is hereby incorporated by reference in its entirety. It will be appreciated that the temperature sensor 3012 may be implemented as a different type of temperature sensor, such as a thermocouple.

If the temperature sensor 3012 determines that the sensed temperature is too high, the cooling module 3002 may be activated. The activation of the cooling module 3002 may be driven, for example, by a switch, relay, or processor. For example, as shown in FIG. 30, the temperature sensor 3012 may activate a cooling fan 3014 that may form part of the cooling module 3002. FIG. 31 depicts cooling fins 3016 that may form part of the cooling module 3002 and that may promote air circulation to facilitate cooling.

In operation, an interface 3018, such as a tee fitting, may divert a portion of the fluid flowing through the pressure hose 3008 to a first pressure cooling line 3020. The first pressure cooling line 3020 may have a smaller diameter than the pressure hose 3008 so that, given the same or substantially similar pressure, the throughput of the first pressure cooling line 3020 may be less than the throughput of the pressure hose 3008. This may cause the fluid to flow relatively slowly through the cooling module 3002, allowing the cooling module 3002 more time to cool the fluid. After the fluid is cooled, the cooling module 3002 may output the fluid to the container 3004 through a second pressure cooling line 3022.

Figure 33:
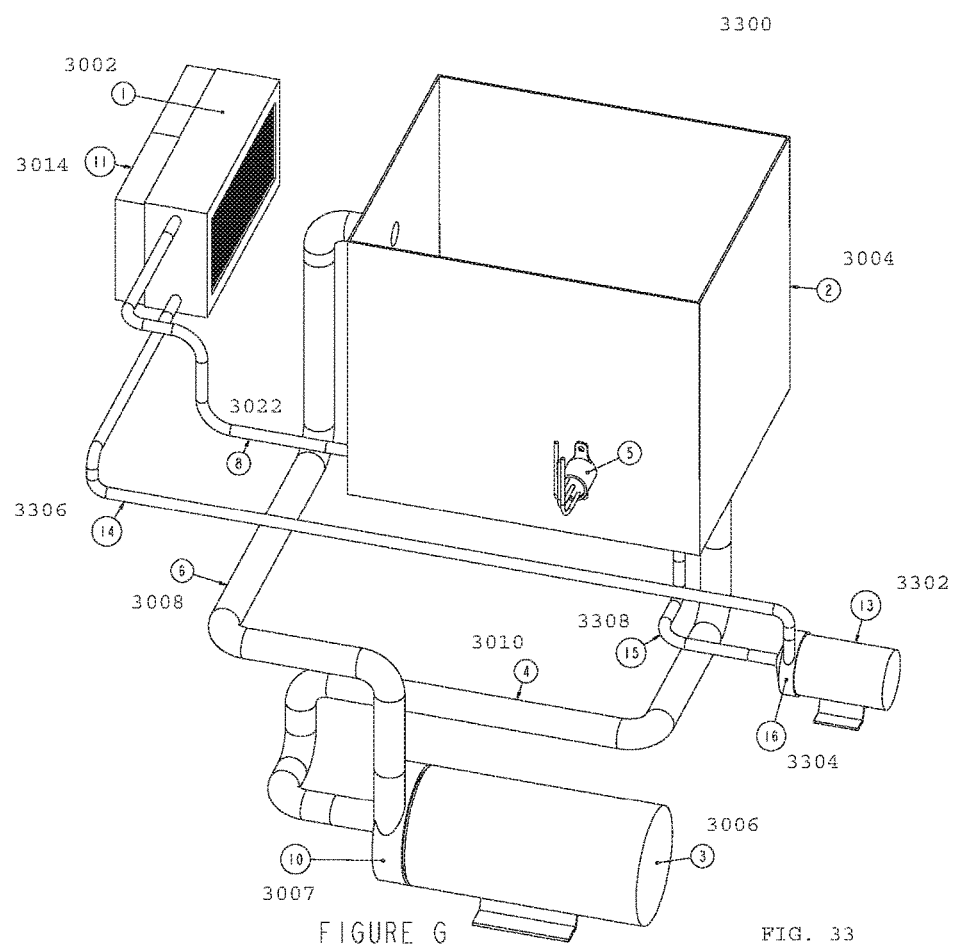
FIG. 33 is a perspective view of another temperature-controlled system according to another embodiment.

FIG. 33 is a perspective view of another temperature-controlled system 3300 according to another embodiment. Certain of the components of the temperature-controlled system 3300 are similar in function to similar components of the temperature-controlled system 3000 and are denoted by similar reference numerals. In addition, the temperature-controlled system 3300 may include an auxiliary pump 3302 having an auxiliary pump impeller housing 3304. The auxiliary pump 3302 may provide fluid to the cooling module 3002 via an auxiliary pressure hose 3306. After the fluid has been cooled, it may exit the cooling module 3002 through the pressure cooling line 3022 and flow into the container 3004. The auxiliary pump 3302 may pump fluid out of the container 3004 through an auxiliary suction hose 3308.

It is to be understood that even though numerous characteristics and advantages of various embodiments have been set forth in the description, together with details of the structure and function of various embodiments, this disclosure is illustrative only, and changes may be made in detail, especially in matters of structure and arrangement of parts within the principles described herein to the full extent indicated by the broad general meaning of the terms in which the appended claims are expressed

What is claimed is:

1. A system for removing soluble support material from a prototype part, the system comprising:
 a container for receiving the prototype part;
 a pump in fluid communication with the container and configured to pump an aqueous cleaning solution into the container via a pressure hose and out of the container;
 a cooling module in fluid communication with the pump and arranged to, when activated, cool the aqueous cleaning solution;
 an interface arranged to divert a portion of the aqueous cleaning solution from the pressure hose to a first pressure cooling line; and
 a temperature sensor operatively coupled to the cooling module and configured to sense temperature of the container and to activate the cooling module if a sensed temperature exceeds a threshold.

2. The system of claim 1, further comprising an auxiliary pump in fluid communication with the cooling module and configured to pump the solution into the cooling module.

3. The system of claim 1, the cooling module comprising at least one of a heat exchanger or a refrigerant.

4. The system of claim 1, wherein the first pressure cooling line has a diameter smaller than a diameter of the pressure hose.

5. The system of claim 1, wherein the interface comprises a tee fitting.

6. The system of claim 1, further comprising a second pressure cooling line in fluid communication with the container and with the first pressure cooling line.

7. A method for removing soluble support material from a prototype part, the method comprising:
 receiving the prototype part in a container;
 pumping an aqueous cleaning solution into the container via a pressure hose and out of the container;
 sensing a temperature of the solution;
 activating a cooling module to cool the aqueous cleaning solution if the sensed temperature exceeds a threshold; and
 diverting a portion of the aqueous cleaning solution from the pressure hose to a first pressure cooling line.

8. The method of claim 7, the cooling module comprising at least one of a heat exchanger or a refrigerant.

9. The method of claim 7, wherein the first pressure cooling line has a diameter smaller than a diameter of the pressure hose.

* * * * *